United States Patent
Kondo

(10) Patent No.: US 8,059,172 B2
(45) Date of Patent: Nov. 15, 2011

(54) SOLID-STATE IMAGING APPARATUS HAVING MULTIPLE CHANNEL OUTPUT

(75) Inventor: Toru Kondo, Hino (JP)

(73) Assignee: Olympus Corporation, Tokyo (JP)

( * ) Notice: Subject to any disclaimer, the term of this patent is extended or adjusted under 35 U.S.C. 154(b) by 521 days.

(21) Appl. No.: 11/790,944

(22) Filed: Apr. 30, 2007

(65) Prior Publication Data

US 2007/0258000 A1 Nov. 8, 2007

(30) Foreign Application Priority Data

May 2, 2006 (JP) ................................. 2006-128183

(51) Int. Cl.
H04N 5/335 (2006.01)
(52) U.S. Cl. ......... 348/241; 348/294; 348/300; 348/308
(58) Field of Classification Search .......... 348/241–243, 348/245, 246, 248, 294, 300–308
See application file for complete search history.

(56) References Cited

U.S. PATENT DOCUMENTS

| 6,037,577 | A | * | 3/2000 | Tanaka et al. | 250/208.1 |
| 6,784,928 | B1 | * | 8/2004 | Sakurai et al. | 348/220.1 |
| 2005/0018064 | A1 | * | 1/2005 | Itoh et al. | 348/308 |
| 2005/0253945 | A1 | * | 11/2005 | Shinohara | 348/300 |
| 2005/0270393 | A1 | * | 12/2005 | Noda et al. | 348/308 |
| 2005/0285958 | A1 | * | 12/2005 | Matsuda | 348/300 |

FOREIGN PATENT DOCUMENTS

JP 2004-328671 A 11/2004

* cited by examiner

*Primary Examiner* — David Ometz
*Assistant Examiner* — Dwight C Tejano
(74) *Attorney, Agent, or Firm* — Westerman, Hattori, Daniels & Adrian, LLP

(57) ABSTRACT

A solid-state imaging apparatus of the present invention including: a pixel section having pixels two-dimensionally disposed in a row and column directions each containing a photoelectric conversion section and an amplification section for amplifying and outputting as pixel signal an output of the photoelectric conversion section; a first scanning section for selecting rows to be read of the pixel section; a noise suppressing section for effecting noise suppression of the pixel signals; a second scanning section for causing pixel signals having gone through the noise suppressing section to be outputted from a plurality of horizontal signal lines; and a control section having a plurality of drive modes to be set, different in the number of the horizontal signal lines from which the pixel signals are outputted, and, when a drive mode is set, changing in accordance with the set drive mode the manner of connection of a function device within the noise suppressing section associated with the horizontal signal lines pertinent to the drive mode.

3 Claims, 14 Drawing Sheets

SOLID-STATE IMAGING APPARATUS HAVING MULTIPLE CHANNEL OUTPUT

This application claims benefit of Japanese Patent Application No. 2006-128183 filed in Japan on May 2, 2006, the contents of which are incorporated by this reference.

BACKGROUND OF THE INVENTION

The present invention relates to solid-state imaging apparatus using a multiple channel output system.

The multiple channel output systems made so as to concurrently obtain a plurality of video signals in parallel from a single imaging device have conventionally been employed as a general technique for obtaining the video signals at high frame rates from the imaging device having several million pixels. The high frame rates, however, are not necessarily required for example in the case of such imaging apparatus as a digital camera where still pictures are taken. There are also methods where the number of channels to be read is varied for example according to image taking situation.

FIG. 1 is a circuit diagram showing a portion of construction of imaging device disclosed in Japanese Patent Application Laid-Open 2004-328671 as an example of construction where the number of channels to be read is varied for example corresponding to image taking situation in a multiple channel output system of MOS imaging device. The imaging device as shown in FIG. 1 includes: unit pixels P1$a$ to P2$b$ each having photodiode PD1 serving as a photoelectric conversion section, an amplification transistor $M_1$ for amplifying detection signal of the photodiode, a reset transistor $M_2$ for resetting detection signal of the photodiode PD1, a row select transistor $M_3$ for selecting each row of a pixel section, and a pixel power supply VDD; a vertical scanning section for driving the unit pixels P1$a$ to P2$b$; a vertical signal line 3-A for outputting signal output of the unit pixels P1$a$ and P2$a$; a vertical signal line 3-B for outputting signal output of the unit pixels P1$b$ and P2$b$; biasing transistors $M_5A$ and $M_5B$ for respectively flowing a constant current through the vertical signal lines 3-A and 3-B; a bias current adjusting voltage line VBIAS for determining current values of the biasing transistors $M_5A$ and $M_5B$; noise suppressing sections 10A and 10B connected to both ends respectively of the vertical signal lines 3-A and 3-B, for suppressing noise components of the signals of the unit pixels P1$a$ to P2$b$; a column select transistor $M_{1\_3}A$ for reading signals from the noise suppressing section 10A out to horizontal signal lines 15-1 and 15-2; a column select transistor $M_{1\_3}B$ for reading signals from the noise suppressing section 10B out to horizontal signal lines 15-3 and 15-4; a horizontal scanning section 20 disposed at both sides of a pixel section with placing the pixel section between, for driving the column select transistors $M_{1\_3}A$ and $M_{1\_3}B$; and output amplifiers 16-1 to 16-4 connected to terminal ends of the horizontal signal lines 15-1 to 15-4. The signals from the output amplifiers 16-1 to 16-4 are then fetched from output channels OUT1 to OUT4 as multiple channel output.

Here, the noise suppressing section 10A connected to the horizontal signal lines 15-1 and 15-2 includes: a clamping capacitor $C_{1\_1}A$ connected to the vertical signal line 3-A or 3-B; a hold capacitor $C_{1\_2}A$ for retaining change in voltage of the vertical signal line 3-A or 3-B; a sample-hold transistor $M_{1\_1}A$ for connecting between the clamping capacitor $C_{1\_1}A$ and hold capacitor $C_{1\_2}A$; and a clamping transistor $M_{1\_2}A$ for clamping the clamping capacitor $C_{1\_1}A$ and hold capacitor $C_{1\_2}A$ to a predetermined voltage. A sample-hold control pulse φ SH1 is supplied to gate of the sample-hold transistor $M_{1\_1}A$, and a clamp control pulse φ CL1 is supplied to gate of the clamping transistor $M_{1\_2}A$.

Further, the noise suppressing section 10B connected to the horizontal signal lines 15-3 and 15-4 includes: a clamping capacitor $C_{1\_1}B$ connected to the vertical signal line 3-A or 3-B; a hold capacitor $C_{1\_2}B$ for retaining change in voltage of the vertical signal line 3-A or 3-B; a sample-hold transistor $M_{1\_1}B$ for connecting between the clamping capacitor $C_{1\_1}B$ and hold capacitor $C_{1\_2}B$; and a clamping transistor $M_{1\_2}B$ for clamping the clamping capacitor $C_{1\_1}B$ and hold capacitor $C_{1\_2}B$ to a predetermined voltage. A control pulse φ SH2 is supplied to the gate of the sample-hold transistor $M_{1\_1}B$, and a control pulse φ CL2 is supplied to the gate of the clamping transistor $M_{1\_2}B$.

FIG. 2A schematically shows a drive timing chart of 4-channel mode for reading the signals of all pixels from the output channels OUT1, OUT2, OUT3, and OUT4 in the above prior-art example shown in FIG. 1. When a row select pulse of the first row φ ROW1 is driven to H level, the row select transistor $M_3$ of the unit pixels of the first row is turned ON so that signal voltages of the unit pixels P1$a$ and P1$b$ of the first row are outputted respectively to the vertical signal lines 3-A and 3-B. At this time, the clamp control pulse φ CL1 and sample-hold control pulse φ SH1 are driven to H level to turn ON the sample-hold transistor $M_{1\_1}A$ and clamping transistor $M_{1\_2}A$ of the noise suppressing section 10A. The clamping capacitor $C_{1\_1}A$ and hold capacitor $C_{1\_2}A$ are thereby fixed to reference potential VREF.

Next, by driving the clamp control pulse φ CL1 to L level to turn OFF the clamping transistor $M_{1\_2}A$ of the noise suppressing section 10A, the connecting line between the clamping capacitor $C_{1\_1}A$ and hold capacitor $C_{1\_2}A$ is brought into a floating state. Subsequently, the reset transistor $M_2$ of the unit pixels of the first row is turned ON by driving the reset control pulse φ RES1 of the first row to H level to reset detection signal of photodiode PD1. Next, the reset control pulse φ RES1 is returned to L level again to turn OFF the reset transistor $M_2$. At this time, voltage change Δ Vsig1 between before and after resetting photodiode PD1 occurs on the vertical signal lines 3-A and 3-B and is accumulated at the hold capacitor $C_{1\_2}A$ through the clamping capacitor $C_{1\_1}A$ and sample-hold transistor $M_{1\_1}A$.

Subsequently, the sample-hold control pulse φ SH1 is driven to L level to turn OFF the sample-hold transistor $M_{1\_1}A$. The signal component indicated by the following formula (1) is thereby retained as signal component of photodiode PD1 of the unit pixel of the first row at the hold capacitor $C_{1\_2}A$ of the noise suppressing section 10A.

$$\text{VREF} + \{C_{1\_1}A/(C_{1\_1}A + C_{1\_2}A)\} \times \Delta\text{Vsig1} \ldots \quad (1)$$

Next, when the row select pulse φ ROW2 of the second row is driven to H level, the row select transistor $M_3$ of the unit pixels of the second row is turned ON so that signal voltages of the unit pixels P2$a$ and P2$b$ of the second row are outputted respectively to the vertical signal lines 3-A and 3-B. At this time, the clamp control pulse φ CL2 and sample-hold control pulse φ SH2 are driven to H level to turn ON the sample-hold transistor $M_{1\_1}B$ and clamping transistor $M_{1\_2}B$ of the noise suppressing section 10B. The clamping capacitor $C_{1\_1}B$ and hold capacitor $C_{1\_2}B$ are thereby fixed to reference potential VREF.

Next, by driving the clamp control pulse φ CL2 to L level to turn OFF the clamping transistor $M_{1\_2}B$ of the noise suppressing section 10B, the connecting line between the clamping capacitor $C_{1\_1}B$ and hold capacitor $C_{1\_2}B$ is brought into floating state. Subsequently, the reset transistor $M_2$ of the unit pixels of the second row is turned ON by driving the reset control pulse φ RES2 of the second row to H level to reset detection signal of photodiode PD1. Next, the reset control pulse φ RES2 is returned to L level again to turn OFF the reset transistor $M_2$. At this time, voltage change Δ Vsig2 between before and after resetting photodiode PD1 occurs on the vertical signal lines 3-A and 3-B and is accumulated at the hold capacitor $C_{1\_2}B$ through the clamping capacitor $C_{1\_1}B$ and sample-hold transistor $M_{1\_1}B$.

Subsequently, the sample-hold control pulse φ SH2 is driven to L level to turn OFF the sample-hold transistor $M_{1\_1}B$. The signal component indicated by the following formula (2) is thereby retained as signal component of photodiode PD1 of the unit pixel of the second row at the hold capacitor $C_{1\_2}B$ of the noise suppressing section 10B.

$$VREF+\{C_{1\_1}B/(C_{1\_1}B+C_{1\_2}B)\} \times \Delta Vsig2 \ldots \quad (2)$$

Finally, the horizontal select pulse φ H1 outputted from the horizontal scanning section 20 is driven to H level to turn ON the column select transistor $M_{1\_3}A$. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Concurrently, the column select transistor $M_{1\_3}B$ is turned ON, whereby signal component retained at the hold capacitor $C_{1\_2}B$ of the noise suppressing section 10B is read out respectively to the horizontal signal lines 15-3 and 15-4 and goes through the output amplifiers 16-3 and 16-4 so that the pixel signals of the unit pixels of the second row are read out respectively from the output channels OUT3 and OUT4. Similar operation is performed for a number of times equal to one half of the total number of the pixel rows so as to read the signals of all pixels from the output channels OUT1, OUT2, OUT3, and OUT4.

With the reading as the above in 4-channel mode, the signals of all pixels can be read out at high rate by using the four output channels to concurrently read two rows of pixel signal at a time.

FIG. 2B schematically shows a drive timing chart of 2-channel mode for reading the signals of all pixels only from the output channels OUT1 and OUT2 in the prior-art example shown in FIG. 1. When the row select pulse φ ROW1 of the first row is driven to H level, the row select transistor $M_3$ of the unit pixels of the first row is turned ON so that signal voltages of the unit pixels P1a and P1b are outputted respectively to the vertical signal lines 3-A and 3-B. At this time, the clamp control pulse φ CL1 and sample-hold pulse φ SH1 are driven to H level to turn ON the sample-hold transistor $M_{1\_1}A$ and clamping transistor $M_{1\_2}A$ of the noise suppressing section 10A. The clamping capacitor $C_{1\_1}A$ and hold capacitor $C_{1\_2}A$ are thereby fixed to reference potential VREF.

Next, the connecting line between the clamping capacitor $C_{1\_1}A$ and hold capacitor $C_{1\_2}A$ is brought into floating state by driving the clamp control pulse φ CL1 to L level to turn OFF the clamping transistor $M_{1\_2}A$ of the noise suppressing section 10A. Subsequently, the reset control pulse φ RES1 of the first row is driven to H level to turn ON the reset transistor $M_2$ of the unit pixels of the first row so that detection signal of photodiode PD1 is reset. Next, the reset control pulse φ RES1 is returned to L level again to turn OFF the reset transistor $M_2$. At this time, voltage change Δ Vsig1 between before and after resetting photodiode PD1 occurs on the vertical signal lines 3-A and 3-B and is accumulated at the hold capacitor $C_{1\_2}A$ through the clamping capacitor $C_{1\_1}A$ and sample-hold transistor $M_{1\_1}A$.

Subsequently, the sample-hold control pulse φ SH1 is driven to L level to turn OFF the sample-hold transistor $M_{1\_1}A$. The signal component indicated by the following formula (3) is thereby retained as signal component of photodiode PD1 of the unit pixel of the first row at the hold capacitor $C_{1\_2}A$ of the noise suppressing section 10A.

$$VREF+\{C_{1\_1}A/(C_{1\_1}A+C_{1\_2}A)\} \times \Delta Vsig1 \ldots \quad (3)$$

Finally, the column select transistor $M_{1\_3}A$ is turned ON by H level of the horizontal select pulse φ H1 outputted from the horizontal scanning section 20. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out from the output channels OUT1 and OUT2. Similar operation is performed for a number of times equal to the total number of pixel rows so as to read the signals of all pixels from the output channels OUT1 and OUT2.

In 2-channel mode where the reading is effected as the above, factors of causing variance in characteristic can be reduced by reducing the number of channels-in the outputting so as to improve image quality. Power consumption can also be reduced by stopping operation of unnecessary circuits. As has been shown above, it is possible according to the prior-art technique to switch between image taking at high frame rate and image taking of high image quality and low power consumption by switching the number of output channels.

SUMMARY OF THE INVENTION

In accordance with a first aspect of the invention, there is provided a solid-state imaging apparatus including: a pixel section having pixels two-dimensionally disposed in a row and column directions each containing a photoelectric conversion section and an amplification section for amplifying and outputting as pixel signal an output of the photoelectric conversion section; a first scanning section for selecting rows to be read of the pixel section; a noise suppressing section for effecting noise suppression of the pixel signals; a second scanning section for causing pixel signals having gone through the noise suppressing section to be outputted from a plurality of horizontal signal lines; and a control section having a plurality of drive modes to be set, different in the number of the horizontal signal lines from which the pixel signals are outputted, and, when a drive mode is set, changing in accordance with the set drive mode the manner of connection of a function device within the noise suppressing section associated with the horizontal signal lines pertinent to the drive mode.

A first to fifth embodiments hereinafter correspond to an embodiment of the solid-state imaging apparatus according to the first aspect. In thus constructed solid-state imaging apparatus, the manner of connection of a function device within the noise suppressing section associated with the horizontal signal lines pertinent to the drive mode is changed in accordance with the set drive mode. It is thereby possible, for example, that a function device in the noise suppressing section which has conventionally been used only in those drive modes using many horizontal signal lines may also be used as a function device in the noise suppressing section in the case where a drive mode with fewer horizontal signal lines is set. The noise suppressing section can be achieved as having a wider range of function.

In a second aspect of the invention, the noise suppressing section of the solid-state imaging apparatus according to the first aspect is composed of a plurality of noise suppressing subunits disposed at each of the horizontal signal lines, for effecting noise suppression of the pixel signals. Each noise suppressing subunit includes a capacitor. The control section, when the drive mode is set, links the capacitor of a second noise suppressing subunit associated with a second horizontal signal line not pertinent to the set drive mode to the capacitor of a first noise suppressing subunit associated with a first horizontal signal line pertinent to the set drive mode.

The first to fifth embodiments correspond to an embodiment of the solid-state imaging apparatus according to the second aspect. When the drive mode is set in thus constructed solid-state imaging apparatus, the capacitor of the second noise suppressing subunit associated with the second horizontal signal line not pertinent to the set drive mode is liked with the capacitor of the first noise suppressing subunit associated with the first horizontal signal line pertinent to the set drive mode. It is thereby possible to provide the noise suppressing section with a wider function similarly to the solid-state imaging apparatus according to the first aspect.

In a third aspect of the invention, the noise suppressing subunit of the solid-state imaging apparatus according to the second aspect is composed of a clamp type noise suppressing circuit having a clamping capacitor for generating output corresponding to a difference signal indicating difference from a second pixel signal level with using a first pixel signal level as reference. The control section, when the drive mode is set, connects the clamping capacitor of the second noise suppressing subunit in parallel with the clamping capacitor of the first noise suppressing subunit.

The first embodiment corresponds to an embodiment of the solid-state imaging apparatus according to the third aspect. When the drive mode is set in thus constructed solid-state imaging apparatus, the clamping capacitor of the second noise suppressing subunit is connected in parallel with the clamping capacitor of the first noise suppressing subunit. It is thereby possible to increase a gain at the noise suppressing section so that effect of noise mixed after the noise suppressing section can be reduced to achieve a further improvement in image quality.

In a fourth aspect of the invention, the noise suppressing subunit of the solid-state imaging apparatus according to the second aspect is composed of a clamp type noise suppressing circuit having a clamping capacitor for generating output corresponding to a difference signal indicating difference from a second pixel signal level with using a first pixel signal level as reference, an inverting amplifier for outputting an inverted amplification signal of the difference signal, and a feedback capacitor connected between an input terminal and output terminal of the inverting amplifier. The control section, when the drive mode is set, effects at least a parallel connection of the clamping capacitor of the second noise suppressing subunit with the clamping capacitor of the first noise suppressing subunit or a series connection of the feedback capacitor of the second noise suppressing subunit to the feedback capacitor of the first noise suppressing subunit.

The second and third embodiments correspond to an embodiment of the solid-state imaging apparatus according to the fourth aspect. When the drive mode is set in thus constructed imaging apparatus, at least a parallel connection of the clamping capacitor of the second noise suppressing subunit with the clamping capacitor of the first noise suppressing subunit, or a series connection of the feedback capacitor of the second noise suppressing subunit to the feedback capacitor of the first noise suppressing subunit is effected. It is thereby possible to increase a gain at the noise suppressing section so that effect of noise mixed after the noise suppressing section can be reduced to achieve a further improvement in image quality.

In a fifth aspect of the invention, the noise suppressing subunit of the solid-state imaging apparatus according to the second aspect is composed of a clamp type noise suppressing circuit having a clamping capacitor for generating output corresponding to a difference signal indicating difference from a second pixel signal level with using a first pixel signal level as reference, a differential amplifier to which the difference signal is applied at non-inverting input terminal thereof to output a normal amplification signal, a feedback capacitor connected between an inverting input terminal and output terminal of the differential amplifier, and an amplifying capacitor connected between the inverting input terminal of the differential amplifier and reference potential. The control section, when the drive mode is set, effects at least a parallel connection of the amplifying capacitor of the second noise suppressing subunit with the amplifying capacitor of the first noise suppressing subunit or a series connection of the feedback capacitor of the second noise suppressing subunit to the feedback capacitor of the first noise suppressing subunit.

The fourth embodiment corresponds to an embodiment of the solid-state imaging apparatus according to the fifth aspect. When the drive mode is set in thus constructed imaging apparatus, at least a parallel connection of the amplifying capacitor of the second noise suppressing subunit with the amplifying capacitor of the first noise suppressing subunit, or a series connection of the feedback capacitor of the second noise suppressing subunit to the feedback capacitor of the first noise suppressing subunit is effected. It is thereby possible to increase a gain at the noise suppressing section so that effect of noise mixed after the noise suppressing section can be reduced to achieve a further improvement in image quality.

In a sixth aspect of the invention, the noise suppressing subunit in the solid-state imaging apparatus according to any one of the second to fifth aspects has a hold capacitor for retaining the pixel signals after noise suppression. The control section, when the drive mode is set, connects the hold capacitor of the second noise suppressing subunit in parallel with the hold capacitor of the first noise suppressing subunit.

The fifth embodiment corresponds to an embodiment of the solid-state imaging apparatus according to the sixth aspect. When the drive mode is set in thus constructed imaging apparatus, the hold capacitor of the second noise suppressing subunit is connected in parallel with the hold capacitor of the first noise suppressing subunit. It is thereby possible to increase the read gain onto the horizontal signal line so that effect of noise mixed after the noise suppressing section can be reduced to achieve a further improvement in image quality.

In a seventh aspect of the invention, when the drive mode is set in the solid-state imaging apparatus according to the sixth aspect, pixels signals retained at the hold capacitor of the first noise suppressing subunit and at the hold capacitor of the second noise suppressing subunit are of different rows.

The fifth embodiment corresponds to an embodiment of the solid-state imaging apparatus according to the seventh aspect. When the drive mode is set in thus constructed imaging apparatus, the hold capacitor of the first noise suppressing subunit and the hold capacitor of the second noise suppressing subunit are to retain pixel signals of different rows. An added averaging of the pixel signals of different rows thereby becomes possible so that both an increased frame rate and an improved image quality can be achieved.

In an eighth aspect of the invention, the control section in the solid-state imaging apparatus according to any one of the first to seventh aspects sets the drive mode in accordance with image taking conditions.

The first to fifth embodiments correspond to an embodiment of the solid-state imaging apparatus according to the eighth aspect. In thus constructed imaging apparatus, an improved image quality can be achieved, since the setting of a drive mode in accordance with image taking conditions makes it possible to select an optimal construction and drive method of the noise suppressing section.

DESCRIPTION OF THE PREFERRED EMBODIMENT

Some embodiments of the solid-state imaging apparatus according to the present invention will be described below with reference to the drawings.

Embodiment 1

Figure 3:
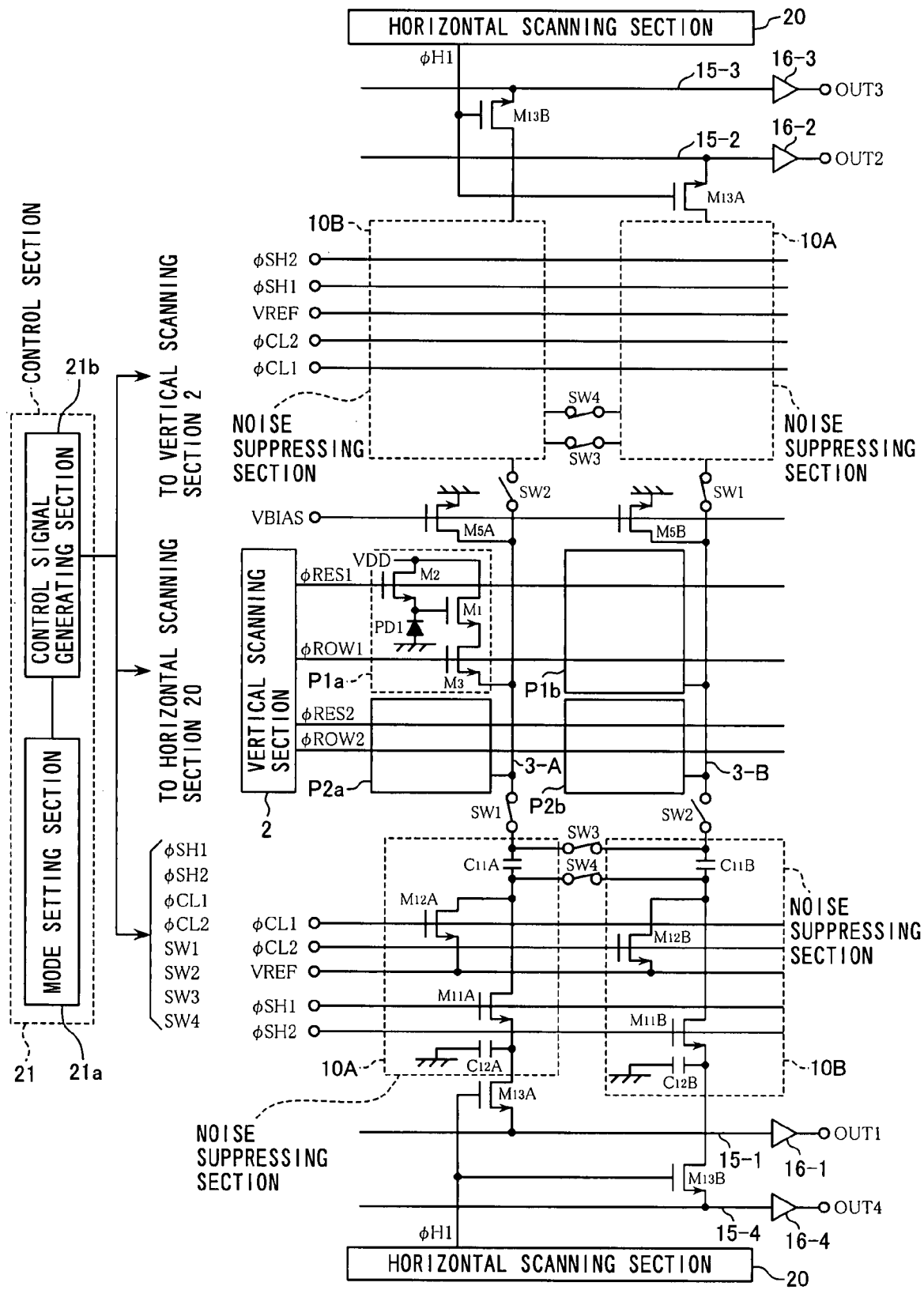
FIG. 3 is a circuit diagram showing in a partially omitted manner construction of a first embodiment of the solid-state imaging apparatus according to the invention.

A first embodiment of the solid-state imaging apparatus according to the invention will now be described. FIG. 3 is a circuit diagram showing a portion of construction of the solid-state imaging apparatus according to the first embodiment. The solid-state imaging apparatus according to this embodiment includes: unit pixels P1$a$ to P2$b$ each having photodiode PD1 serving as a photoelectric conversion section, an amplification transistor $M_1$ for amplifying detection signal of the photodiode PD1, a reset transistor $M_2$ for resetting detection signal of photodiode PD1, a row select transistor $M_3$ for selecting each row of a pixel section, and a pixel power supply VDD; a vertical scanning section for driving the unit pixels P1$a$ to P2$b$; a vertical signal line 3-A for outputting signal output of the unit pixels P1$a$ and P2$a$; a vertical signal line 3-B for outputting signal output of the unit pixels P1$b$ and P2$b$; biasing transistors $M_5A$ and $M_5B$ for respectively flowing a constant current through the vertical signal lines 3-A and 3-B; a bias current adjusting voltage line VBIAS for determining current value of the biasing transistors $M_5A$ and $M_5B$; clamp type noise suppressing sections 10A and 10B connected to both ends respectively of the vertical signal lines 3-A and 3-B, for suppressing noise components of the signals of the unit pixels P1$a$ to P2$b$; a column select transistor $M_{1\_3}A$ for reading signals from the noise suppressing section 10A out to horizontal signal lines 15-1 and 15-2; a column select transistor $M_{1\_3}B$ for reading signals from the noise suppressing section 10B out to horizontal signal lines 15-3 and 15-4; a horizontal scanning section 20 disposed at both sides of a pixel section so as to place it between, for driving the column select transistors $M_{1\_3}A$ and $M_{1\_3}B$; and output amplifiers 16-1 to 16-4 connected to terminal ends of the horizontal signal lines 15-1 to 15-4. The signals from the output amplifiers 16-1 to 16-4 are then fetched from output channels OUT1 to OUT4 as multiple channel output.

The noise suppressing section 10A connected to the horizontal signal lines 15-1 and 15-2 includes: a clamping capacitor $C_{1\_1}A$ connected to the vertical signal line 3-A or 3-B; a hold capacitor $C_{1\_2}A$ for retaining change in voltage of the vertical signal line 3-A or 3-B; a sample-hold transistor $M_{1\_1}A$ for connecting between the clamping capacitor $C_{1\_1}A$ and hold capacitor $C_{1\_2}A$; and a clamping transistor $M_{1\_2}A$ for clamping the clamping capacitor $C_{1\_1}A$ and hold capacitor $C_{1\_2}A$ to a predetermined voltage. A sample-hold control pulse φ SH1 is supplied to gate of the sample-hold transistor $M_{1\_1}A$, and a clamp control pulse φ CL1 is supplied to gate of the clamping transistor $M_{1\_2}A$.

Further, the noise suppressing section 10B connected to the horizontal signal lines 15-3 and 15-4 includes: a clamping capacitor $C_{1\_1}B$ connected to the vertical signal line 3-A or 3-B; a hold capacitor $C_{1\_2}B$ for retaining change in voltage of the vertical signal line 3-A or 3-B; a sample-hold transistor $M_{1\_1}B$ for connecting between the clamping capacitor $C_{1\_1}B$ and hold capacitor $C_{1\_2}B$; and a clamping transistor $M_{1\_1}B$ for clamping the clamping capacitor $C_{1\_1}B$ and hold capacitor $C_{1\_2}B$ to a predetermined voltage. A sample-hold control pulse φ SH2 is supplied to the gate of the sample-hold transistor $M_{1\_1}B$, and a clamp control pulse φ CL2 is supplied to the gate of the clamping transistor $M_{1\_2}B$.

Also included are: a switch device SW1 for connecting between the vertical signal line 3-A or 3-B and the noise suppressing section 10A; a switch device SW2 for connecting between the vertical signal line 3-A or 3-B and the noise suppressing section 10B; and switch devices SW3 and SW4 for respectively connecting between the two ends of the clamping capacitor $C_{1\_1}A$ of the noise suppressing section 10A and the two ends of the clamping capacitor $C_{1\_1}B$ of the noise suppressing section 10B. It should be noted that, while the case of constructing the pixel section by 4 unit pixels of 2×2 has been shown in FIG. 3, a pixel section in actuality is composed of a large number of unit pixels that are two-dimensionally disposed in a row and column directions, and the vertical signal line, noise suppressing section, column select transistor, etc. are disposed similarly for each unit pixel.

Further included are: a mode setting section 21$a$ for setting a drive mode (4-channel mode, 2-channel mode etc.), and a control signal generating section 21$b$ for outputting control signals (control signals for the vertical scanning section, the horizontal scanning section 20, and the switch devices SW1~SW4, and control pulses φ SH1, φ SH2, φ CL1 and φ CL2) according to the drive mode set by the mode setting section 21a. The mode setting section 21a and the control signal generating section 21b comprises a control section 21.

Figure 4A:
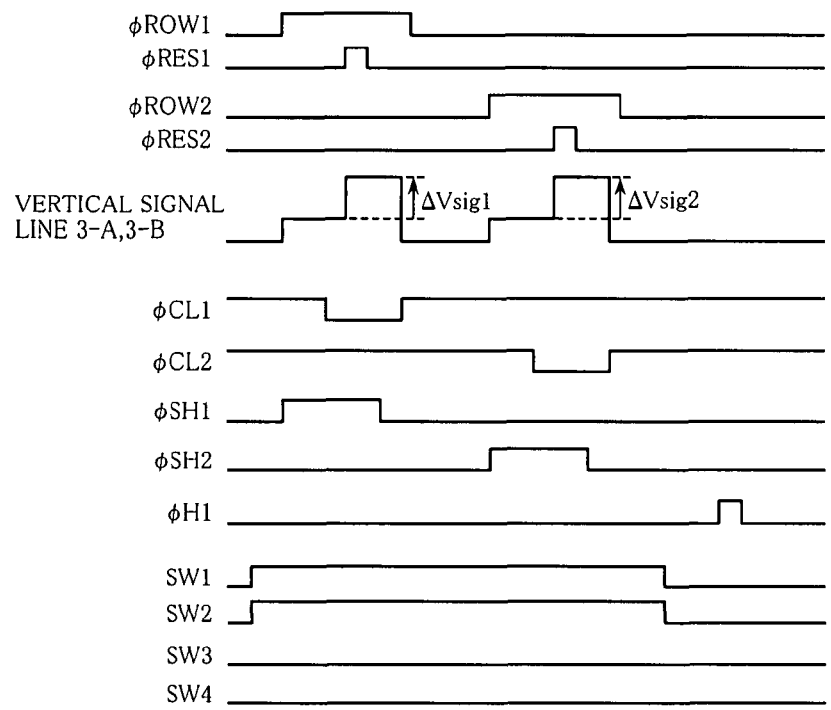
FIGS. 4A and 4B each are a timing chart for explaining operation of the first embodiment shown in FIG. 3.

An operation will now be described of the solid-state imaging apparatus according to thus constructed first embodiment. FIG. 4A schematically shows a drive timing chart of 4-channel mode where signals of all pixels are read out from the output channels OUT1, OUT2, OUT3, and OUT4 in the first embodiment. At first in this mode, switch device SW1 is turned ON, switch device SW2 ON, switch device SW3 OFF, and switch device SW4 OFF. The subsequent operation is exactly the same as the prior-art example so that the read operation of 4-channel mode is similar to that of the prior-art example.

In particular, when a row select pulse of the first row $\phi$ ROW1 is driven to H level, the row select transistor $M_3$ of the unit pixels of the first row is turned ON so that signal voltages of the unit pixels P1a and P1b of the first row are outputted respectively to the vertical signal lines 3-A and 3-B. At this time, the clamp control pulse $\phi$ CL1 and sample-hold control pulse $\phi$ SH1 are driven to H level to turn ON the sample-hold transistor $M_{1\_1}A$ and clamping transistor $M_{1\_2}A$ of the noise suppressing section 10A. The clamping capacitor $C_{1\_1}A$ and hold capacitor $C_{1\_2}A$ are thereby fixed to reference potential VREF.

Next, by driving the clamp control pulse $\phi$ CL1 to L level to turn OFF the clamping transistor $M_{1\_2}A$ of the noise suppressing section 10A, the connecting line between the clamping capacitor $C_{1\_1}A$ and hold capacitor $C_{1\_2}A$ is brought into a floating state. Subsequently, the reset transistor $M_2$ of the unit pixels of the first row is turned ON by driving the reset control pulse $\phi$ RES1 of the first row to H level to reset detection signal of photodiode PD1. Next, the reset control pulse $\phi$ RES1 is returned to L level again to turn OFF the reset transistor $M_2$. At this time, voltage change $\Delta Vsig1$ between before and after resetting photodiode PD1 occurs on the vertical signal lines 3-A and 3-B and is accumulated at the hold capacitor $C_{1\_2}A$ through the clamping capacitor $C_{1\_1}A$ and sample-hold transistor $M_{1\_1}A$.

Subsequently, the sample-hold control pulse $\phi$ SH1 is driven to L level to turn OFF the sample-hold transistor $M_{1\_1}A$. The signal component indicated by the following formula (4) is thereby retained as signal component of photodiode PD1 of the unit pixel of the first row at the hold capacitor $C_{1\_2}A$ of the noise suppressing section 10A.

$$VREF + \{C_{1\_1}A/(C_{1\_1}A + C_{1\_2}A)\} \times \Delta Vsig1 \ldots \quad (4)$$

Next, when the row select pulse $\phi$ ROW2 of the second row is driven to H level, the row select transistor $M_3$ of the unit pixels of the second row is turned ON so that signal voltages of the unit pixels P2a and P2b of the second row are outputted respectively to the vertical signal lines 3-A and 3-B. At this time, the clamp control pulse $\phi$ CL2 and sample-hold control pulse $\phi$ SH2 are driven to H level to turn ON the sample-hold transistor $M_{1\_1}B$ and clamping transistor $M_{1\_2}B$ of the noise suppressing section 10B. The clamping capacitor $C_{1\_1}B$ and hold capacitor $C_{1\_2}B$ are thereby fixed to reference potential VREF.

Next, by driving the clamp control pulse $\phi$ CL2 to L level to turn OFF the clamping transistor $M_{1\_2}B$ of the noise suppressing section 10B, the connecting line between the clamping capacitor $C_{1\_1}B$ and hold capacitor $C_{1\_2}B$ is brought into floating state. Subsequently, the reset transistor $M_2$ of the unit pixels of the second row is turned ON by driving the reset control pulse $\phi$ RES2 of the second row to H level to reset detection signal of photodiode PD1. Next, the reset control pulse $\phi$ RES2 is returned to L level again to turn OFF the reset transistor $M_2$. At this time, voltage change $\Delta Vsig2$ between before and after resetting photodiode PD1 occurs on the vertical signal lines 3-A and 3-B and is accumulated at the hold capacitor $C_{1\_2}B$ through the clamping capacitor $C_{1\_1}B$ and sample-hold transistor $M_{1\_1}B$.

Subsequently, the sample-hold control pulse $\phi$ SH2 is driven to L level to turn OFF the sample-hold transistor $M_{1\_1}B$. The signal component indicated by the following formula (5) is thereby retained as signal component of photodiode PD1 of the unit pixel of the second row at the hold capacitor $C_{1\_2}B$ of the noise suppressing section 10B.

$$VREF + \{C_{1\_1}B/(C_{1\_1}B + C_{1\_2}B)\} \times \Delta Vsig2 \ldots \quad (5)$$

Finally, the horizontal select pulse $\phi$ H1 outputted from the horizontal scanning section 20 is driven to H level to turn ON the column select transistor $M_{1\_3}A$. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Concurrently, the column select transistor $M_{1\_3}B$ is turned ON, whereby signal component retained at the hold capacitor $C_{1\_2}B$ of the noise suppressing section 10B is read out respectively to the horizontal signal lines 15-3 and 15-4 and goes through the output amplifiers 16-3 and 16-4 so that the pixel signals of the unit pixels of the second row are read out respectively from the output channels OUT3 and OUT4. Similar operation is performed for a number of times equal to one half of the total number of the pixel rows so as to read the signals of all pixels from the output channels OUT1, OUT2, OUT3, and OUT4. As has been shown, the reading not changed from the prior-art example is effected of 4-channel mode.

Figure 4B:
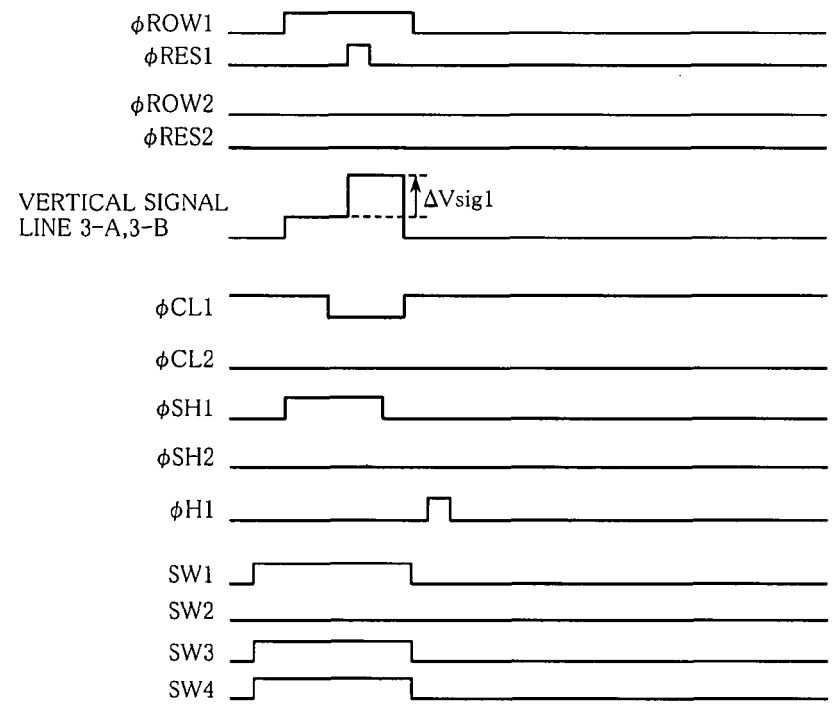

FIG. 4B schematically shows a drive timing chart of 2-channel mode where the signals of all pixels are read out only from the output channels OUT1 and OUT2 in the first embodiment. At first in this mode, the switch device SW1 is ON, switch device SW2 OFF, switch device SW3 ON, and switch device SW4 ON. The clamping capacitors $C_{1\_1}A$ and $C_{1\_1}B$ of the noise suppressing section 10A and noise suppressing section 10B are thereby connected in parallel with each other.

Subsequently, when the row select pulse $\phi$ ROW1 of the first row is driven to H level, the row select transistor $M_3$ of the unit pixels of the first row is turned ON so that signal voltages of the unit pixels P1a and P1b of the first row are outputted respectively to the vertical signal lines 3-A and 3-B. At this time, the clamp control pulse $\phi$ CL1 and sample-hold pulse $\phi$ SH1 are driven to H level to turn ON the sample-hold transistor $M_{1\_1}A$ and clamping transistor $M_{1\_2}A$ of the noise suppressing section 10A. The clamping capacitors $C_{1\_1}A$ and $C_{1\_1}B$ and hold capacitor $C_{1\_2}A$ are thereby fixed to reference potential VREF.

Next, the connecting line between the clamping capacitor $C_{1\_1}A$ and hold capacitor $C_{1\_2}A$ is brought into floating state by driving the clamp control pulse $\phi$ CL1 to L level to turn OFF the clamping transistor $M_{1\_2}A$ of the noise suppressing section 10A. Subsequently, the reset control pulse $\phi$ RES1 of the first row is driven to H level to turn ON the reset transistor $M_2$ of the unit pixels of the first row so that detection signal of photodiode PD1 is reset. Next, the reset control pulse $\phi$ RES1 is returned to L level again to turn OFF the reset transistor $M_2$. At this time, voltage change $\Delta Vsig1$ between before and after resetting photodiode PD1 occurs on the vertical signal lines 3-A and 3-B and is accumulated at the hold capacitor $C_{1\_2}A$ through the clamping capacitors $C_{1\_1}A$ and $C_{1\_1}B$ and sample-hold transistor $M_{1\_1}A$.

Subsequently, the sample-hold control pulse φ SH1 is driven to L level to turn OFF the sample-hold transistor $M_{1\_1}A$. The signal component indicated by the following formula (6) is thereby retained as signal component of photodiode PD1 of the unit pixel of the first row at the hold capacitor $C_{1\_2}A$ of the noise suppressing section 10A.

$$VREF+\{(C_{1\_1}A+C_{1\_1}B)/(C_{1\_1}A+C_{1\_1}B+C_{1\_2}A)\} \times \Delta V\text{sig}1 \ldots \quad (6)$$

Here, putting $C_{1\_1}A=C_{1\_1}B$, the signal component as indicated by the following formula (7) is to be retained.

$$VREF+\{2C_{1\_1}A/(2C_{1\_1}A+C_{1\_2}A)\} \times \Delta V\text{sig}1 \ldots \quad (7)$$

Finally, the column select transistor $M_{1\_3}A$ is turned ON by driving the horizontal select pulse φ H1 outputted from the horizontal scanning section 20 to H level. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Similar operation is performed for a number of times equal to the total number of pixel rows so as to read the signals of all pixels respectively from the output channels OUT1 and OUT2. In 2-channel mode, therefore, a gain for the signals at the noise suppressing section is greater as compared to the prior-art example.

In this manner, with 2-channel mode according to the first embodiment where the signals of all pixels are read out only from the output channels OUT1 and OUT2 as compared to 4-channel mode where the signals of all pixels are read out from the output channels OUT1, OUT2, OUT3, and OUT4, the clamping capacitor $C_{1\_1}B$ of the noise suppressing section 10B corresponding to the output channels OUT3 and OUT4 is connected in parallel with the clamping capacitor $C_{1\_1}A$ of the noise suppressing section 10A corresponding to the output channels OUT1 and OUT2 to make it possible to provide function for increasing the gain at the noise suppressing section. Since effect of noise mixed after the noise suppressing section can thus be made smaller, it is possible to improve S/N ratio in 2-channel mode as compared to the prior-art example. It should be noted that the switching control between each drive mode of the above is effected by means of control signals to each section from the control section 21, and switching/setting of these drive mode is set by the mode setting section 21a according to various image taking conditions.

Embodiment 2

Figure 5:
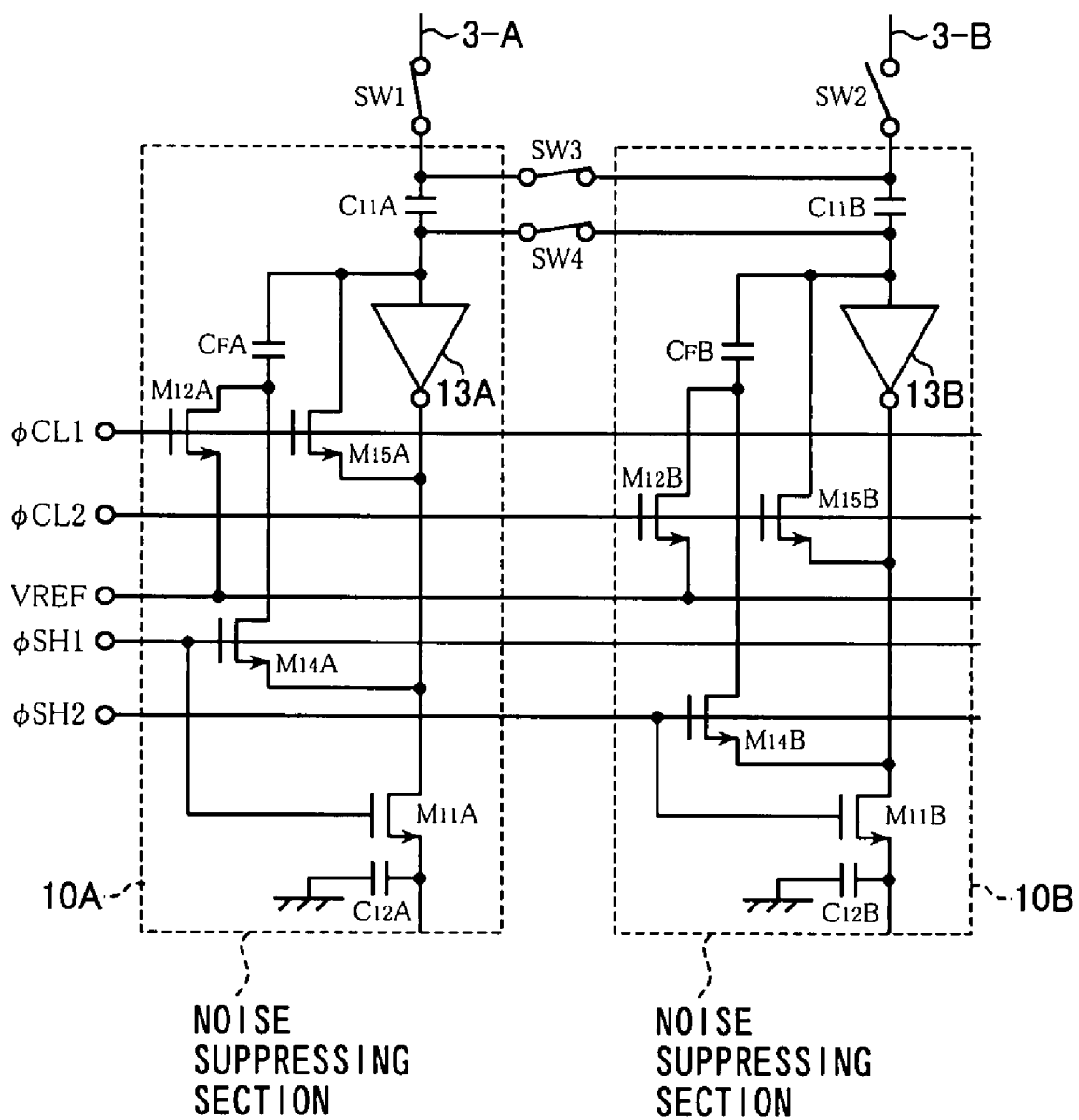
FIG. 5 is a circuit diagram showing construction of a main portion (noise suppressing section) of the solid-state imaging apparatus according to a second embodiment of the invention.

A second embodiment of the solid-state imaging apparatus according to the invention will now be described. FIG. 5 is a circuit diagram showing construction of those noise suppressing sections 10A and 10B disposed on one side of the noise suppressing sections that are disposed at two sides of the pixel section in the solid-state imaging apparatus according to the second embodiment. The construction other than that of the noise suppressing section in the second embodiment is similar to the first embodiment shown in FIG. 3 and will not be shown the figures. Those components corresponding to those in the noise suppressing section of the first embodiment shown in FIG. 3 are denoted by like reference numerals. In this embodiment, the noise suppressing section 10A connected to the output channels OUT1 and OUT2 includes: a clamping capacitor $C_{1\_1}A$ having one end serving as an input section of the noise suppressing section 10A; an inverting amplifier 13A connected to the other end of the clamping capacitor $C_{1\_1}A$; a feedback transistor $M_{1\_5}A$ connected between input and output of the inverting amplifier 13A; a feedback capacitor $C_F A$ connected between-input and output of the inverting amplifier 13A through a sample-hold switch $M_{1\_4}A$; a clamping transistor $M_{1\_2}A$ connecting between the feedback capacitor $C_F A$ and reference potential VREF; and a sample-hold transistor $M_{1\_1}A$ connecting between the output of the inverting amplifier 13A and a hold capacitor $C_{1\_2}A$. A clamp control pulse φ CL1 is supplied to the gates of the clamping transistor $M_{1\_2}A$ and feedback transistor $M_{1\_5}A$, and a sample-hold control pulse φ SH1 is supplied to the gates of the sample-hold transistor $M_{1\_1}A$ and sample-hold switch $M_{14}A$.

On the other hand, the noise suppressing section 10B connected to the output channels OUT3 and OUT4 includes: a clamping capacitor $C_{1\_1}B$ having one end serving as an input section of the noise suppressing section 10B; an inverting amplifier 13B connected to the other end of the clamping capacitor $C_{1\_1}B$; a feedback transistor $M_{1\_5}B$ connected between input and output of the inverting amplifier 13B; a feedback capacitor $C_F B$ connected between input and output of the inverting amplifier 13B through a sample-hold switch $M_{1\_4}B$; a clamping transistor $M_{1\_2}B$ connecting between the feedback capacitor $C_F B$ and reference potential VREF; and a sample-hold transistor $M_{1\_1}B$ connecting between the output of the inverting amplifier 13B and a hold capacitor $C_{1\_2}B$. A clamp control pulse φ CL2 is supplied to the gates of the clamping transistor $M_{1\_2}B$ and feedback transistor $M_{1\_5}B$, and a sample-hold control pulse φ SH2 is supplied to the gates of the sample-hold transistor $M_{1\_1}B$ and sample-hold switch $M_{14}B$.

Further included are: a switch device SW1 for connecting the vertical signal line 3-A or 3-B and the noise suppressing section 10A; a switch device SW2 for connecting the vertical signal line 3-A or 3-B and the noise suppressing section 10B; and switch devices SW3 and SW4 for respectively connecting between two ends of the clamping capacitor $C_{1\_1}A$ of the noise suppressing section 10A and two ends of the clamping capacitor $C_{1\_1}B$ of the noise suppressing section 10B. It should be noted that the other noise suppressing section 10A to be connected to the vertical signal line 3-B and the other noise suppressing section 10B to be connected to the vertical signal line 3-A are not shown in the figures.

Figure 6A:
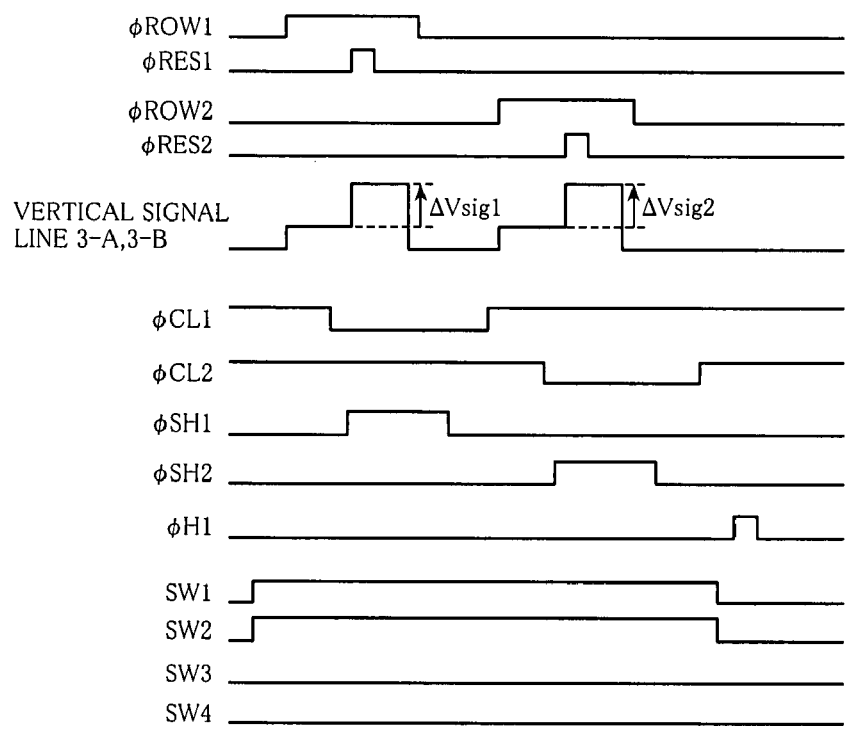
FIGS. 6A and 6B each are a timing chart for explaining operation of the second embodiment shown in FIG. 5.

An operation of thus constructed second embodiment will now be described. FIG. 6A is a timing chart for explaining operation of 4-channel mode in the second embodiment. At first in this mode, the switch device SW1 is ON, switch device SW2 ON, switch device SW3 OFF, and switch device SW4 OFF. Subsequently, when the row select pulse φ ROW1 of the first row is driven to H level, the row select transistor $M_3$ of the unit pixels of the first row is turned ON so that signal voltages of the unit pixels P1a and P1b of the first row are outputted respectively to the vertical signal lines 3-A and 3-B. At this time, the clamping transistor $M_{1\_2}A$ and feedback transistor $M_{1\_5}A$ of the noise suppressing section 10A are turned ON by driving the clamp control pulse φ CL1 to H level so as to fix the feedback capacitor $C_F A$ to VREF.

Next, after driving clamp control pulse φ CL1 to L level, the sample-hold control pulse φ SH1 is driven to H level to turn ON the sample-hold transistor $M_{1\_1}A$ and sample-hold switch $M_{1\_4}A$ of the noise suppressing section 10A. The input and output of the inverting amplifier 13A are thereby connected through the feedback capacitor $C_F A$ so as to form a feedback circuit.

Next, the reset transistor $M_2$ of the unit pixels of the first row is turned ON by driving the reset control pulse φ RES1 of the first row to H level to reset detection signal of photodiode PD1. Next, the reset control pulse φRES1 is returned to L level again to turn OFF the reset transistor $M_2$. At this time, voltage change ΔVsig1 between before and after resetting photodiode PD1 occurs respectively on the vertical signal lines 3-A and 3-B and is accumulated at the hold capacitor $C_{1\_2}A$ through the clamping capacitor $C_{1\_1}A$, feedback capacitor $C_FA$, and inverting amplifier 13A.

Subsequently, the sample-hold control pulse φ SH1 is driven to L level to turn OFF the sample-hold transistor $M_{1\_1}A$. The signal component indicated by the following formula (8) is thereby retained as signal component of photodiode PD1 of the unit pixel of the first row at the hold capacitor $C_{1\_2}A$ of the noise suppressing section 10A.

$$VREF-(C_{1\_1}A/C_FA) \times \Delta Vsig1 \ldots \quad (8)$$

Next, when the row select pulse φ ROW2 of the second row is driven to H level, the row select transistor $M_3$ of the unit pixels of the second row is turned ON so that signal voltages of the unit pixels P2a and P2b of the second row are outputted respectively to the vertical signal lines 3-A and 3-B. When the clamp control pulse φ CL2 and sample-hold control pulse φ SH2 are controlled similarly to the first row, the signal component indicated by the following formula (9) is retained as signal component of photodiode PD1 of the units pixels of the second row at the hold capacitor $C_{1\_2}B$ of the noise suppressing section 10B.

$$VREF-(C_{1\_1}B/C_FB) \times \Delta Vsig2 \ldots \quad (9)$$

Finally, the horizontal select pulse φ H1 outputted from the horizontal scanning section 20 is driven to H level to turn ON the column select transistor $M_{1\_3}A$. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Concurrently, the column select transistor $M_{1\_3}B$ is turned ON, whereby signal component retained at the hold capacitor $C_{1\_2}B$ of the noise suppressing section 10B is read out respectively to the horizontal signal lines 15-3 and 15-4 and goes through the output amplifiers 16-3 and 16-4 so that the pixel signals of the unit pixels of the second row are read out respectively from the output channels OUT3 and OUT4. Similar operation is performed for a number of times equal to one half of the total number of the pixel rows so as to read the signals of all pixels from the output channels OUT1, OUT2, OUT3, and OUT4.

Figure 6B:
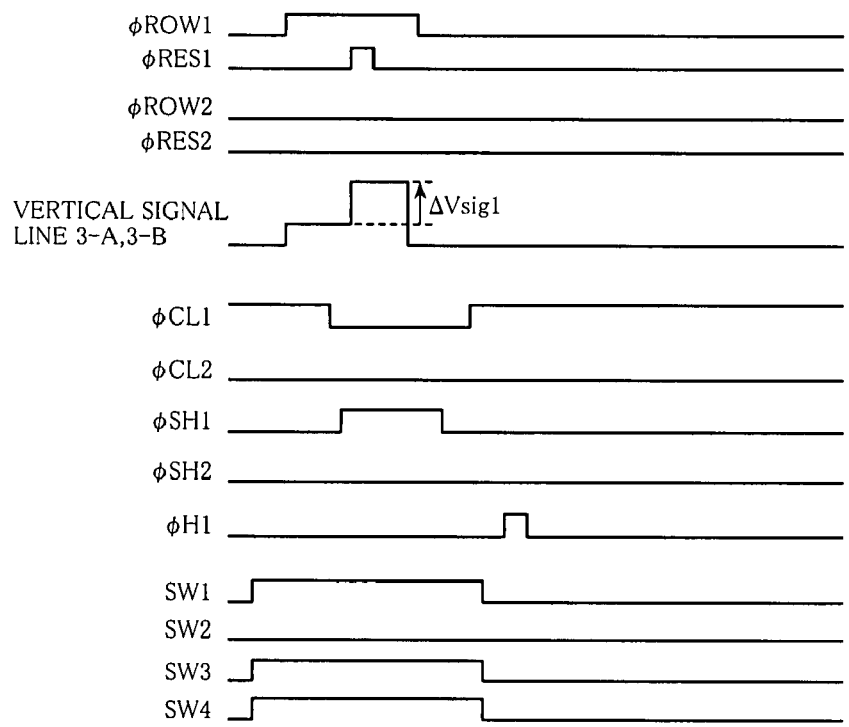

FIG. 6B is a timing chart for explaining operation of 2-channel mode in the second embodiment. At first in this mode, the switch device SW1 is ON, switch device SW2 OFF, switch device SW3 ON, and switch device SW4 ON. The clamping capacitors $C_{1\_1}A$ and $C_{1\_1}B$ of the noise suppressing section 10A and noise suppressing section 10B are thereby connected in parallel with each other. Subsequently, when the row select pulse φ ROW1 of the first row is driven to H level, the row select transistor $M_3$ of the unit pixels of the first row is turned ON so that signal voltages of the unit pixels P1a and P1b of the first row are outputted respectively to the vertical signal lines 3-A and 3-B. At this time, the clamp control pulse φ CL1 is driven to H level to turn ON the clamping transistor $M_{1\_2}A$ and feedback transistor $M_{1\_5}A$ of the noise suppressing section 10A so as to fix the feedback capacitor $C_FA$ to VREF.

Next, after driving clamp control pulse φ CL1 to L level, the sample-hold control pulse φ SH1 is driven to H level to turn ON the sample-hold transistor $M_{1\_1}A$ and sample-hold switch $M_{1\_4}A$ of the noise suppressing section 10A. The input and output of the inverting amplifier 13A are thereby connected through the feedback capacitor $C_FA$ so as to form a feedback circuit. Next, the reset transistor $M_2$ of the unit pixels of the first row is turned ON by driving the reset control pulse φ RES1 of the first row to H level to reset detection signal of photodiode PD1. Next, the reset control pulse φ RES1 is returned to L level again to turn OFF the reset transistor $M_2$. At this time, voltage change ΔVsig1 between before and after resetting photodiode PD1 occurs respectively on the vertical signal lines 3-A and 3-B and is accumulated at the hold capacitor $C_{1\_2}A$ through the clamping capacitors $C_{1\_1}A$ and $C_{1\_1}B$, feedback capacitor $C_FA$, and the inverting amplifier 13A.

Subsequently, by driving the sample-hold control pulse φ SH1 to L level to turn OFF the sample-hold transistor $M_{1\_1}A$, the signal component indicated by the following formula (10) is retained as signal component of photodiode PD1 of the unit pixel of the first row at the hold capacitor $C_{1\_2}A$ of the noise suppressing section 10A.

$$VREF-\{(C_{1\_1}A+C_{1\_1}B)/C_FA\} \times \Delta Vsig1 \ldots \quad (10)$$

Here, putting $C_{1\_1}A=C_{1\_1}B$, the signal component as indicated by the following formula (11) is to be retained.

$$VREF-(2C_{1\_1}A/C_{1\_1}A) \times \Delta Vsig1 \ldots \quad (11)$$

Finally, the column select transistor $M_{1\_3}A$ is turned ON by driving the horizontal select pulse φ H1 outputted from the horizontal scanning section 20 to H level. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out from the output channels OUT1 and OUT2. Similar operation is performed for a number of times equal to the total number of pixel rows so as to read the signals of all pixels respectively from the output channels OUT1 and OUT2. In 2-channel mode, therefore, a gain for the signals at the noise suppressing section is increased to two times that of 4-channel mode.

In this manner, with 2-channel mode according to the second embodiment where the signals of all pixels are read out only from the output channels OUT1 and OUT2 as compared to 4-channel mode where the signals of all pixels are read out from the output channels OUT1, OUT2, OUT3, and OUT4, the clamping capacitor $C_{1\_1}B$ of the noise suppressing section 10B corresponding to the output channels OUT3 and OUT4 is connected in parallel with the clamping capacitor $C_{1\_1}A$ of the noise suppressing section 10A corresponding to the output channels OUT1 and OUT2 to make it possible to provide function for increasing the gain at the noise suppressing section. Since effect of noise mixed after the noise suppressing section can thus be made smaller, it is possible to improve S/N ratio in 2-channel: mode as compared to the prior-art example.

Embodiment 3

A third embodiment of the solid-state imaging apparatus according to the invention will now be described.

Figure 7:
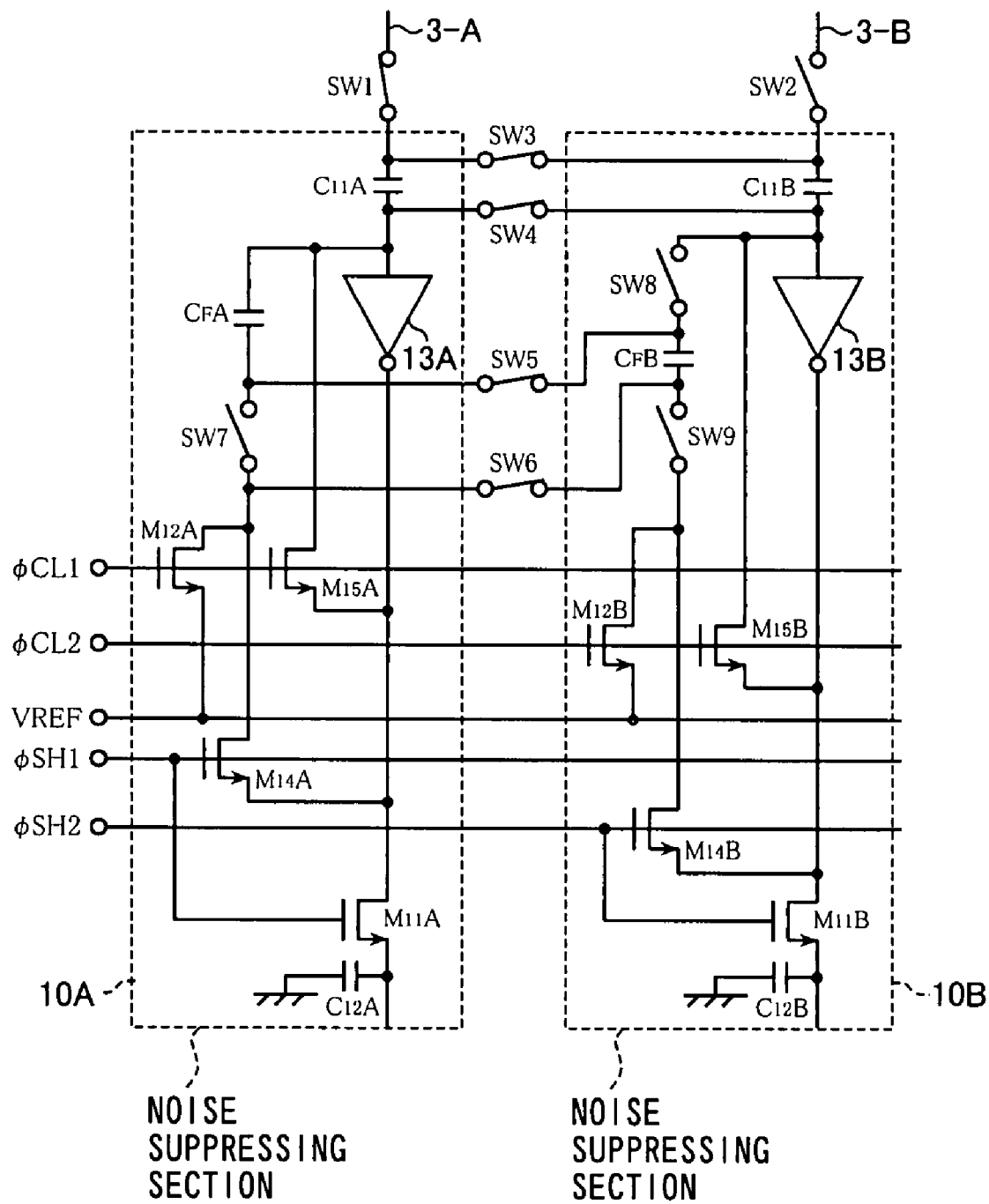
FIG. 7 is a circuit diagram showing construction of a main portion (noise suppressing section) of the solid-state imaging apparatus according to a third embodiment of the invention.

FIG. 7 is a circuit diagram showing construction of those noise suppressing sections 10A and 10B disposed on one side of the noise suppressing sections that are disposed at two sides of the pixel section in the solid-state imaging apparatus according to the third embodiment. In the third embodiment, switch devices SW5 to SW9 are added to the construction of the noise suppressing section of the second embodiment shown in FIG. 5; the construction other than that is similar to the construction of the noise suppressing section shown in FIG. 5, and like components are denoted by like reference numerals. In particular, a switch device SW7 is connected between the feedback capacitor $C_FA$ and the clamping transistor $M_{1\_2}A$ of the noise suppressing section 10A, and a switch device SW8 is connected between input of the inverting amplifier 13B and one end of the feedback capacitor $C_FB$ of the noise suppressing section 10B. Further, a switch device SW9 is connected between the other end of feedback capacitor $C_FB$ and the clamping transistor $M_{1\_2}B$, and switch devices SW5 and SW6 are connected respectively between the two ends of the switch device SW7 provided in the noise suppressing section 10A and the two ends of the feedback capacitor $C_FB$ of the noise suppressing section 10B. Further, the switch-devices SW5~SW9 are controlled by the control signal generating section 21b.

Figure 8A:
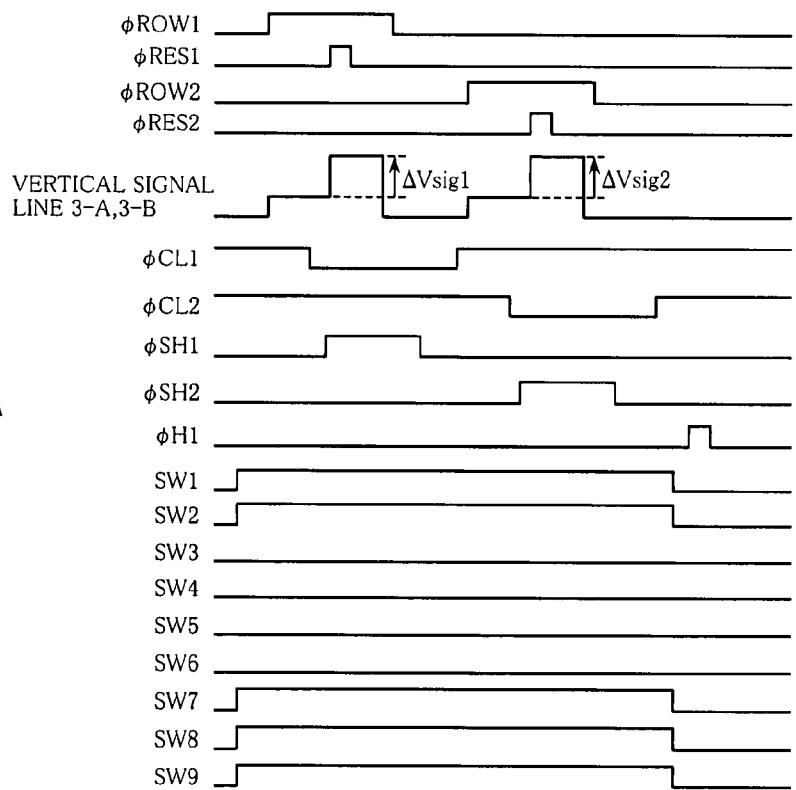
FIGS. 8A and 8B each are a timing chart for explaining operation of the third embodiment shown in FIG. 7.

An operation of thus constructed third embodiment will now be described. FIG. 8A is a timing chart for explaining operation of 4-channel mode in the solid-state imaging apparatus according to the third embodiment. At first in this mode, the switch device SW1 is ON, switch device SW2 ON, switch device SW3 OFF, switch device SW4 OFF, switch device SW5 OFF, switch device SW6 OFF, and switch devices SW7 to SW9 ON. The operation timing of each section after that is similar to the second embodiment. The signal component indicated by the following formula (12) is thereby retained as signal component of photodiode PD1 of the unit pixel of the first row at the hold capacitor $C_{1\_2}A$ of the noise suppressing section 10A.

$$VREF-(C_{1\_1}A/C_FA) \times \Delta Vsig1 \ldots \quad (12)$$

Further, the signal component indicated by the following formula (13) is retained as signal component of photodiode PD1 of the unit pixel of the second row at the hold capacitor $C_{1\_2}B$ of the noise suppressing section 10B.

$$VREF-(C_{1\_1}B/C_FB) \times \Delta Vsig2 \ldots \quad (13)$$

Finally, the horizontal select pulse $\phi$ H1 outputted from the horizontal scanning section 20 is driven to H level to turn ON the column select transistor $M_{1\_3}A$. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Concurrently, the column select transistor $M_{1\_3}B$ is turned ON, whereby signal component retained at the hold capacitor $C_{1\_2}B$ of the noise suppressing section 10B is read out respectively to the horizontal signal lines 15-3 and 15-4 and goes through the output amplifiers 16-3 and 16-4 so that the pixel signals of the unit pixels of the second row are read out respectively from the output channels OUT3 and OUT4. Similar operation is performed for a number of times equal to one half of the total number of the pixel rows so as to read the signals of all pixels from the output channels OUT1, OUT2, OUT3, and OUT4.

Figure 8B:
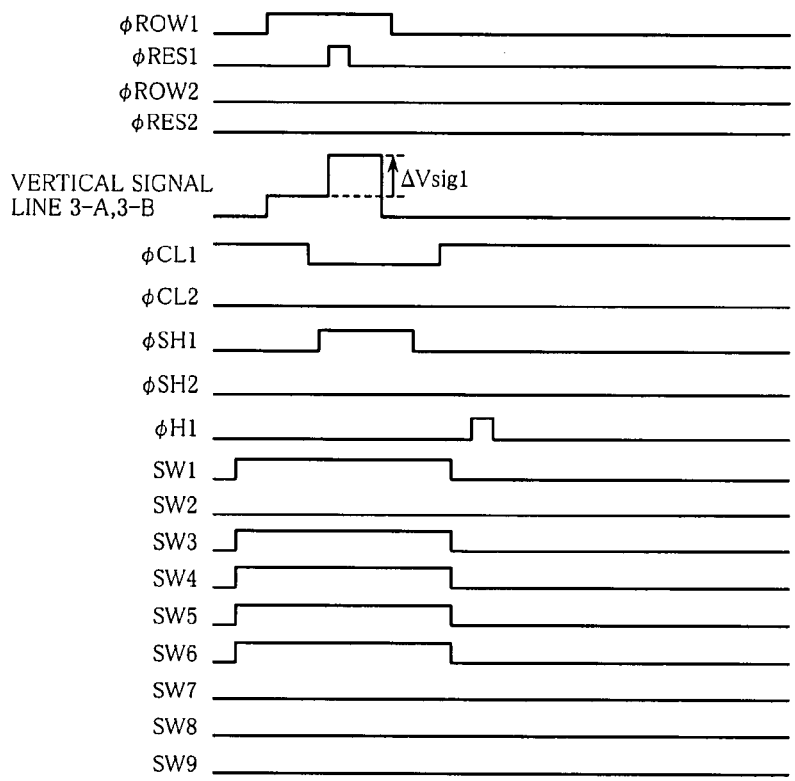

FIG. 8B is a timing chart for explaining operation of 2-channel mode in the third embodiment. At first in this mode, the switch device SW1 is ON, switch device SW2 OFF, switch device SW3 ON, switch device SW4 ON, switch device SW5 ON, switch device SW6 ON, and switch devices SW7 to SW9 OFF. The clamping capacitors $C_{1\_1}A$ and $C_{1\_1}B$ of the noise suppressing section 10A and noise suppressing section 10B are thereby connected in parallel with each other, and the feedback capacitors $C_FA$ and $C_FB$ of the noise suppressing section 10A and noise suppressing section 10B are connected in series.

The timing of operation of each section after that is similar to the second embodiment. The signal component indicated by the following formula (14) is retained as signal component of photodiode PD1 of the unit pixel of the first row at the hold capacitor $C_{1\_2}A$ of the noise suppressing section 10A.

$$VREF - [\{C_{11}A + C_{11}B\}/\{1/(1/C_FA + 1/C_FB)\}] \times \Delta Vsig1 \quad (14)$$

Here, putting $C_{1\_1}A=C_{1\_1}B$ and $C_FA=C_FB$, the signal component as indicated by the following formula (15) is to be retained.

$$VREF - \{2C_{11}A/(C_FA/2)\} \times \Delta Vsig1 = \quad (15)$$
$$VREF - 4(C_{11}A/C_FA) \times \Delta Vsig1$$

Finally, the column select transistor $M_{1\_3}A$ is turned ON by driving the horizontal select pulse $\phi$ H1 outputted from the horizontal scanning section 20 to H level. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Similar operation is performed for a number of times equal to the total number of pixel rows so as to read the signals of all pixels from the output channels OUT1 and OUT2. In 2-channel mode, therefore, a gain for the signals at the noise suppressing section becomes 4 times that of 4-channel mode. Further, even in the case where only the feedback capacitor $C_FA$ and $C_FB$ of the noise suppressing section 10A and noise suppressing section 10B are connected in series to perform the reading without using the switch devices SW3 and SW4, the gain for the signals at the noise suppressing section in 2-channel mode is increased to two times that of 4-channel mode.

In this manner, with 2-channel mode according to the third embodiment where the signals of all pixels are read out only from the output channels OUT1 and OUT2 as compared to 4-channel mode where the signals of all pixels are read out from the output channels OUT1, OUT2, OUT3, and OUT4, the feedback capacitor $C_FB$ of the noise suppressing section 10B corresponding to the output channels OUT3 and OUT4 is connected in series to the feedback capacitor $C_FA$ of the noise suppressing section 10A corresponding to the output channels OUT1 and OUT2 to make it possible to provide function for increasing the gain at the noise suppressing section. Since effect of noise mixed after the noise suppressing section can thus be made smaller, it is possible to improve S/N in 2-channel readout as compared to the prior-art example.

Embodiment 4

Figure 1:
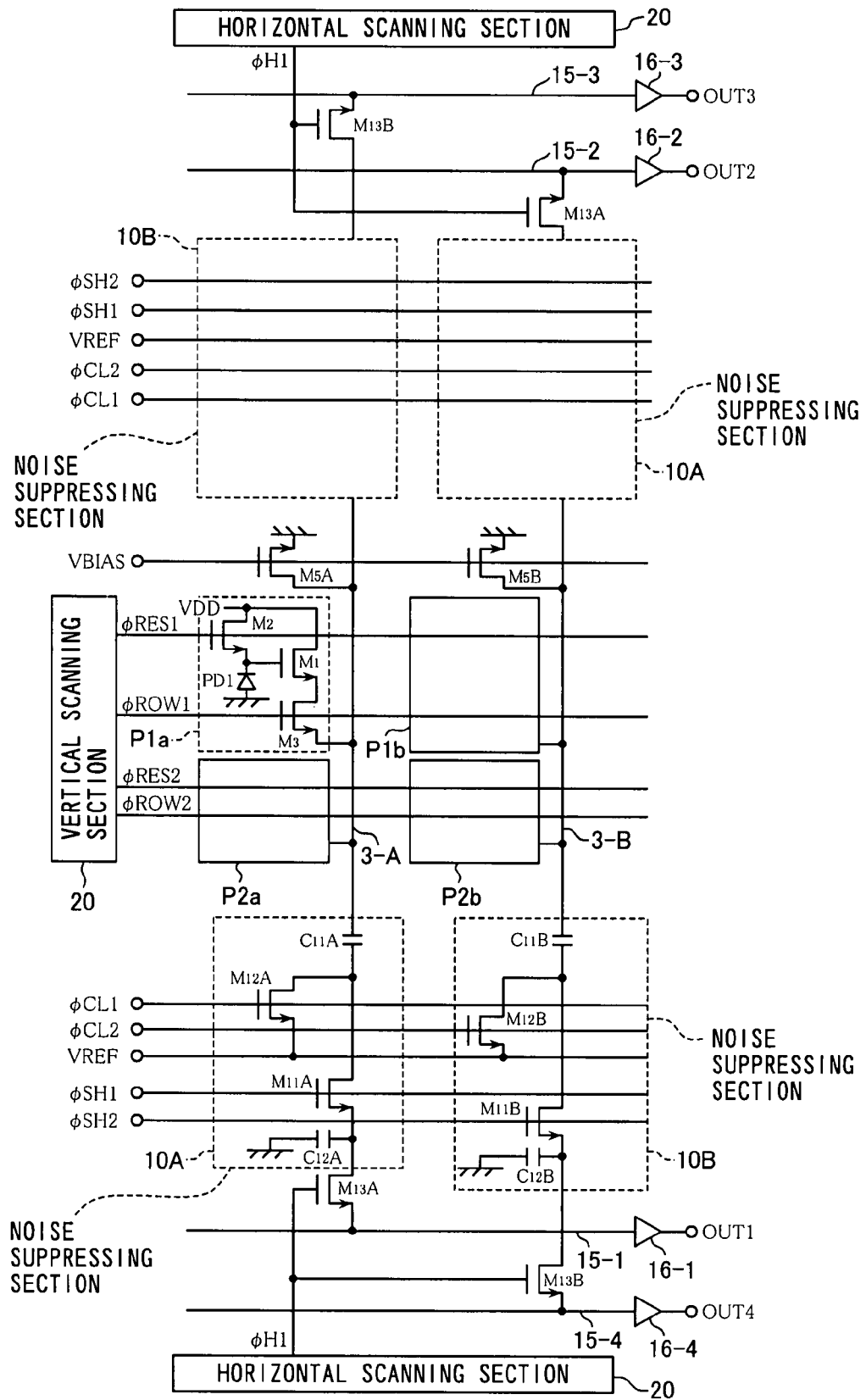
FIG. 1 is a circuit diagram showing an example of construction of prior-art solid-state imaging apparatus.
Figure 2A:
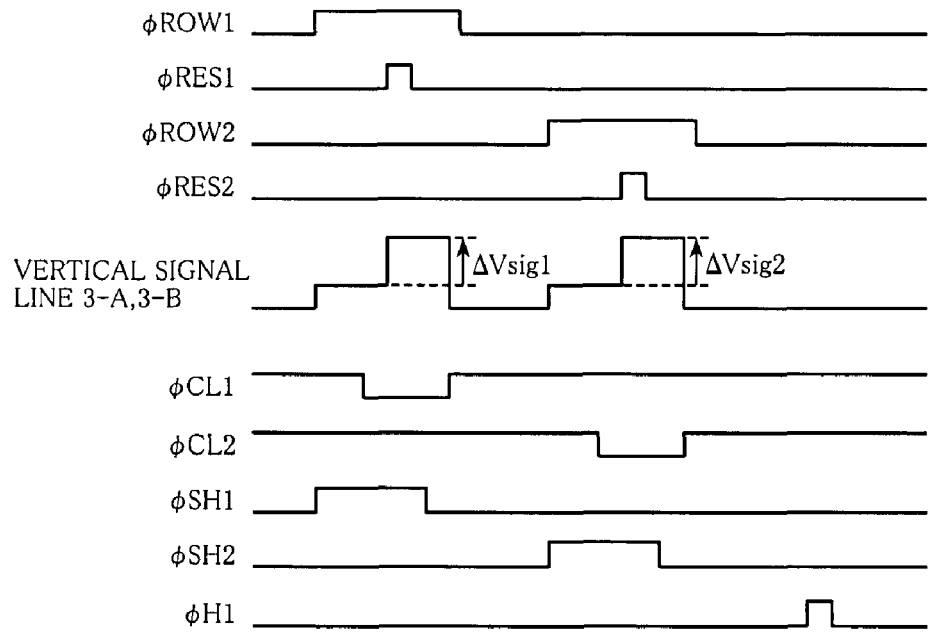
FIGS. 2A and 2B each are a timing chart for explaining operation of the prior-art example shown in FIG. 1.
Figure 2B:
Figure 9:
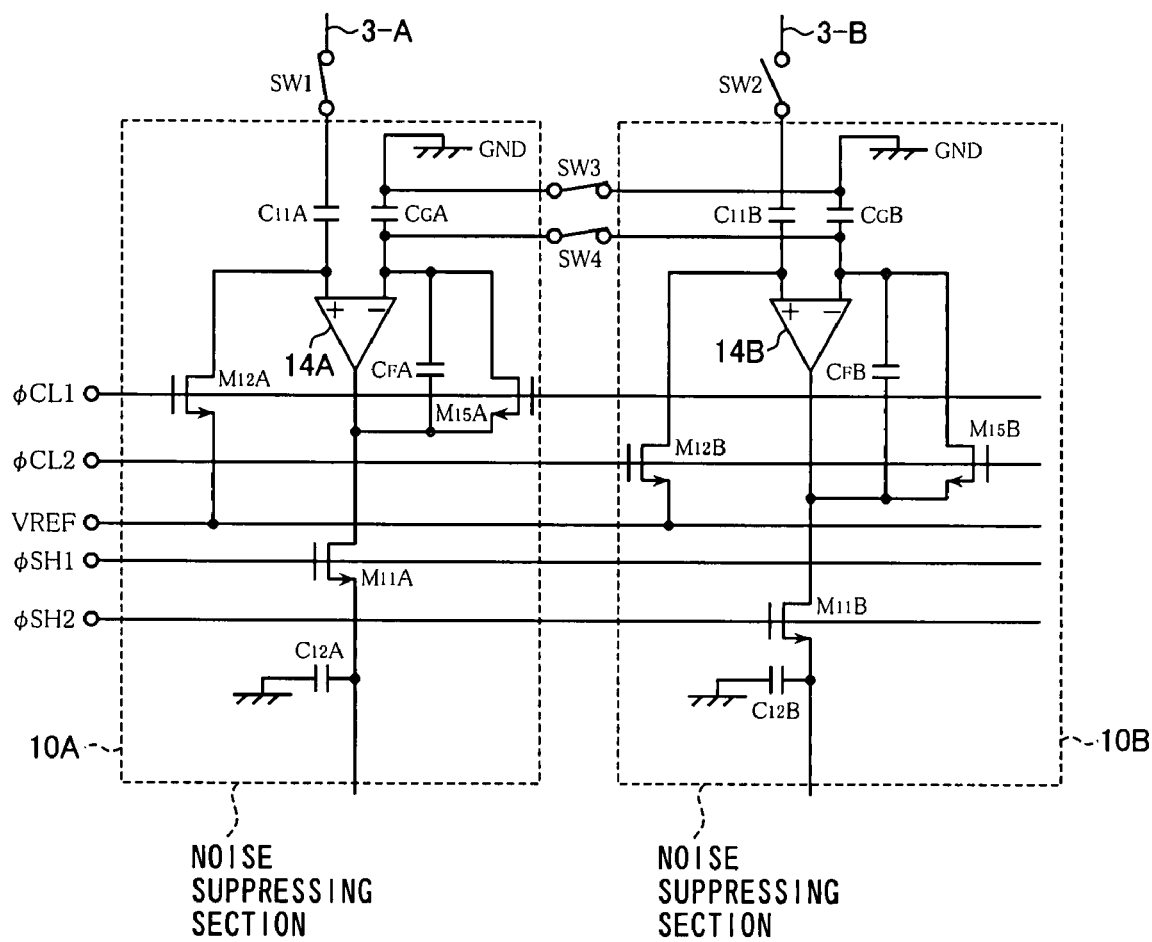
FIG. 9 is a circuit diagram showing construction of a main portion (noise suppressing section) of the solid-state imaging apparatus according to a fourth embodiment of the invention.

A fourth embodiment of the solid-state imaging apparatus according to the invention will now be described. FIG. 9 is a circuit diagram showing construction of those noise suppressing sections 10A and 10B disposed on one side of the noise suppressing sections that are disposed at two sides of the pixel section in the solid-state imaging apparatus according to the fourth embodiment. In the fourth embodiment, the construction other than that of the noise suppressing section is similar to the first embodiment shown in FIG. 1 and is not shown in the figure, and like components as those in the noise suppressing section of the first embodiment shown in FIG. 1 are denoted by like reference numerals. In the fourth embodiment, the noise suppressing section 10A connected respectively to the output channels OUT1 and OUT2 includes: a clamping capacitor $C_{1\_1}A$ having one end serving as an input section of the noise suppressing section 10A; a differential input amplifier 14A of which non-inverting input terminal is connected to the other end of the clamping capacitor $C_{1\_1}A$; a clamping transistor $M_{1\_2}A$ connecting between the clamping capacitor $C_{1\_1}A$ as well as the non-inverting input terminal of the differential input amplifier 14A and a reference potential VREF; a feedback capacitor $C_FA$ and feedback transistor $M_{1\_5}A$ connected between an inverting input terminal of the differential input amplifier 14A and an output terminal of the differential input amplifier 14A; an amplifying capacitor $C_GA$ connected between the inverting input terminal of the differential input amplifier 14A and a reference potential GND; and a sample-hold transistor $M_{1\_1}A$ connecting between the output terminal of the differential input amplifier 14A and a hold capacitor $C_{1\_2}A$. A clamp control pulse φ CL1 is supplied to the gates of the clamping transistor $M_{1\_2}A$ and feedback transistor $M_{1\_5}A$, and a sample-hold control pulse φ SH1 is supplied to the gate of the sample-hold transistor $M_{1\_1}A$.

On the other hand, the noise suppressing section 10B connected respectively to the output channels OUT3 and OUT4 includes: a clamping capacitor $C_{1\_1}B$ having one end serving as an input section of the noise suppressing section 10B; a differential input amplifier 14B of which non-inverting input terminal is connected to the other end of the clamping capacitor $C_{1\_1}B$; a clamping transistor $M_{1\_2}B$ connecting between the clamping capacitor $C_{1\_1}B$ as well as the non-inverting input terminal of the differential input amplifier 14B and a reference potential VREF; a feedback capacitor $C_FB$ and feedback transistor $M_{1\_5}B$ connected between an inverting input terminal of the differential input amplifier 14B and an output terminal of the differential input amplifier 14B; an amplifying capacitor $C_GB$ connected between the inverting input terminal of the differential input amplifier 14B and a reference potential GND; and a sample-hold transistor $M_{1\_1}B$ connecting between the output terminal of the differential input amplifier 14B and a hold capacitor $C_{1\_2}B$. A clamp control pulse φ CL2 is supplied to the gates of the clamping transistor $M_{1\_2}B$ and feedback transistor $M_{1\_5}B$, and a sample-hold control pulse φ SH2 is supplied to the gate of the sample-hold transistor $M_{1\_1}B$.

Further included are: a switch device SW1 for connecting the vertical signal line 3-A or 3-B and the noise suppressing section 10A; a switch device SW2 for connecting the vertical signal line 3-A or 3-B and the noise suppressing section 10B; and switch devices SW3 and SW4 for respectively connecting between two ends of the amplifying capacitor $C_GA$ of the noise suppressing section 10A and two ends of the amplifying capacitor $C_GB$ of the noise suppressing section 10B.

Figure 10A:
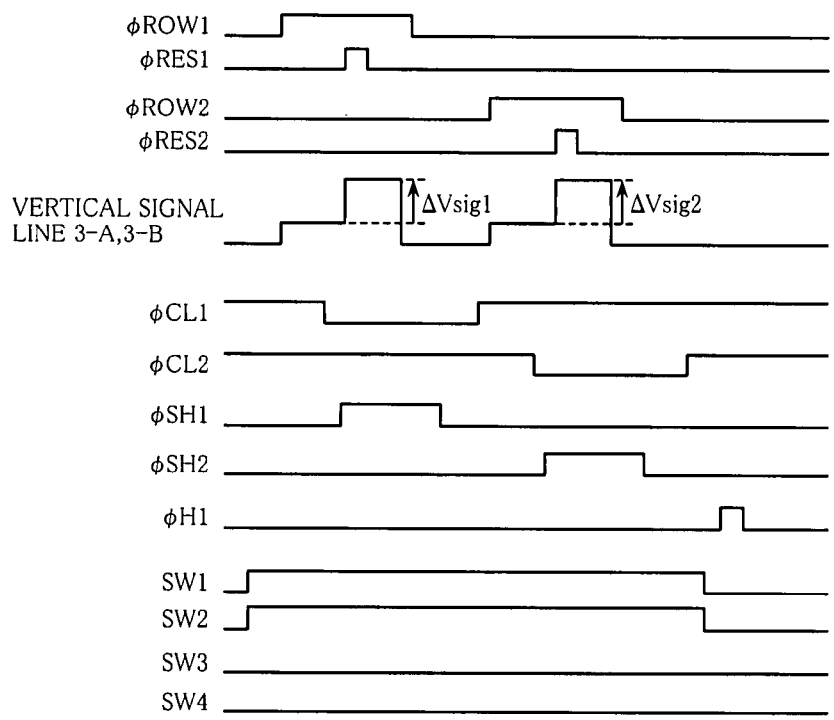
FIGS. 10A and 10B each are a timing chart for explaining operation of the fourth embodiment shown in FIG. 9.

An operation of thus constructed fourth embodiment will now be described. FIG. 10A is a timing chart for explaining operation of 4-channel mode in the fourth embodiment. At first in this mode, the switch device SW1 is turned ON, switch device SW2 ON, switch device SW3 OFF, and switch device SW4 OFF. Next, when the row select pulse φ ROW1 of the first row is driven to H level, the row select transistor $M_3$ of the unit pixels of the first row is turned ON so that signal voltages of the unit pixels P1a and P1b of the first row are outputted to the vertical signal lines 3-A and 3-B. At this time, the clamping transistor $M_{1\_2}A$ and feedback transistor $M_{1\_5}A$ of the noise suppressing section 10A are turned ON by driving the clamp control pulse φ CL1 to H level so as to fix the non-inverting input and the output of the differential input amplifier 14A to VREF.

Next, after driving clamp control pulse φ CL1 to L level, the sample-hold transistor $M_{1\_1}A$ is turned ON by driving the sample-hold control pulse φ SH1 to H level. The inverting input terminal and output terminal of the differential input amplifier 14A are thereby connected through the feedback capacitor $C_FA$ so that a feedback circuit having amplification factor of $(1+C_GA/C_FA)$ is formed.

Next, the reset transistor $M_2$ of the unit pixels of the first row is turned ON by driving the reset control pulse φ RES1 of the first row to H level to reset detection signal of photodiode PD1. Next, the reset control pulse φ RES1 is returned to L level again to turn OFF the reset transistor $M_2$. At this time, voltage change ΔVsig1 between before and after resetting photodiode PD1 occurs on the non-inverting input terminal of the differential input amplifier 15A and is accumulated at the hold capacitor $C_{1\_2}A$ through the differential input amplifier 14A.

Subsequently, by driving the sample-hold control pulse φ SH1 to L level to turn OFF the sample-hold transistor $M_{1\_1}A$, the signal component indicated by the following formula (16) is retained as signal component of photodiode PD1 of the unit pixel of the first row at the hold capacitor $C_{1\_2}A$ of the noise suppressing section 10A.

$$\text{VREF}+(1+C_GA/C_FA)\times\Delta\text{Vsig1}\ldots \quad (16)$$

Next, when the row select pulse φ ROW2 of the second row is driven to H level, the row select transistor $M_3$ of the unit pixels of the second row is turned ON so that signal voltages of the unit pixels P2a and P2b of the second row are outputted respectively to the vertical signal lines 3-A and 3-B. When the clamp control pulse φ CL2 and sample-hold control pulse φ SH2 are controlled similarly to the first row, the signal component indicated by the following formula (17) is retained as signal component of photodiode PD1 of the units pixels of the second row at the hold capacitor $C_{1\_2}B$ of the noise suppressing section 10B.

$$\text{VREF}+(1+C_GB/C_FB)\times\Delta\text{Vsig2}\ldots \quad (17)$$

Finally, the horizontal select pulse φ H1 outputted from the horizontal scanning section 20 is driven to H level to turn ON the column select transistor $M_{1\_3}A$. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Concurrently, the column select transistor $M_{1\_3}B$ is turned ON, whereby signal component retained at the hold capacitor $C_{1\_2}B$ of the noise suppressing section 10B is read out respectively to the horizontal signal lines 15-3 and 15-4 and goes through the output amplifiers 16-3 and 16-4 so that the pixel signals of the unit pixels of the second row are read out respectively from the output channels OUT3 and OUT4. Similar operation is performed for a number of times equal to one half of the total number of the pixel rows so as to read the signals of all pixels from the output channels OUT1, OUT2, OUT3, and OUT4.

Figure 10B:
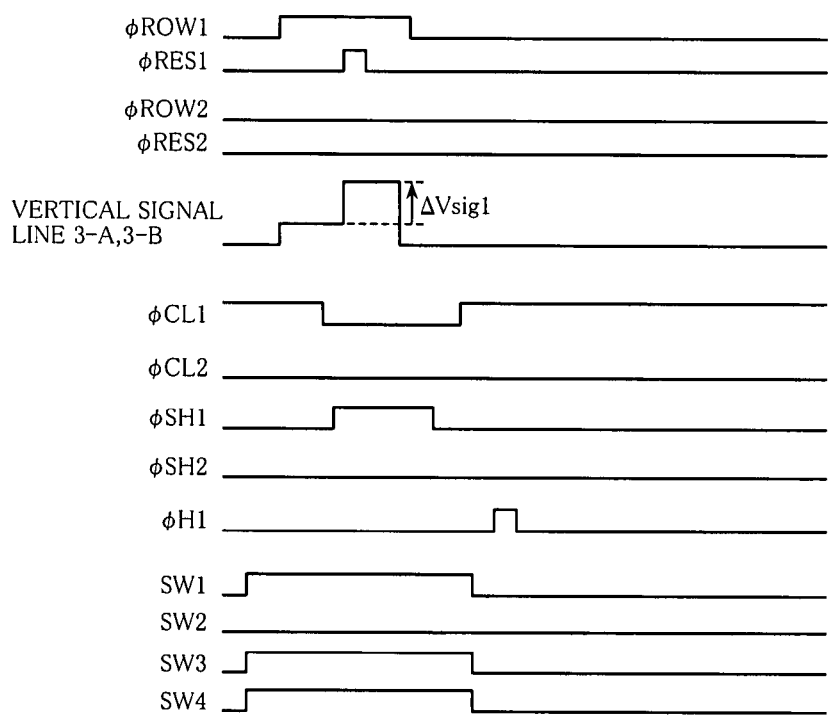

FIG. 10B is a timing chart for explaining operation of 2-channel mode in the fourth embodiment. At first in this mode, the switch device SW1 is ON, switch device SW2 OFF, switch device SW3 ON, and switch device SW4 ON. The amplifying capacitors $C_GA$ and $C_GB$ of the noise suppressing section 10A and noise suppressing section 10B are thereby connected in parallel with each other. Subsequently, when the row select pulse φ ROW of the first row is driven to H level, the row select transistor $M_3$ of the unit pixels of the first row is turned ON so that signal voltages of the unit pixels P1a and P1b of the first row are outputted to the vertical signal lines 3-A and 3-B.

At this time, the clamp control pulse φ CL1 is driven to H level to turn ON the clamping transistor $M_{1\_2}A$ and feedback transistor $M_{1\_5}A$ so as to fix the non-inverting input terminal and the output terminal of the differential input amplifier 14A to VREF.

Next, after driving clamp control pulse φ CL1 to L level, the sample-hold control pulse φ SH1 is driven to H level to turn ON the sample-hold transistor $M_{1\_1}A$. The inverting input terminal and the output terminal of the differential input amplifier 14A are thereby connected through the feedback capacitor $C_FA$ so that a feedback circuit having amplification factor of $\{1+(C_GA+C_GB)/C_FA\}$ is formed. Next, the reset transistor $M_2$ of the unit pixels of the first row is turned ON by driving the reset control pulse φ RES1 of the first row to H level to reset detection signal of photodiode PD1. Next, the reset control pulse RES1 is returned to L level again to turn OFF the reset transistor $M_2$. At this time, voltage change ΔVsig1 between before and after resetting photodiode PD1 occurs on the non-inverting input terminal of the differential input amplifier 14A and is accumulated at the hold capacitor $C_{1\_2}A$ through the differential input amplifier 14A.

Subsequently, by driving the sample-hold control pulse φ SH1 to L level to turn OFF the sample-hold transistor $M_{1\_1}A$, the signal component indicated by the following formula (18) is retained as signal component of photodiode PD1 of the unit pixel of the first row at the hold capacitor $C_{1\_2}A$ of the noise suppressing section 10A.

$$\text{VREF}+\{1+(C_GA+C_GB)/C_FA\}\times \Delta\text{Vsig1} \ldots \quad (18)$$

Here, putting $C_GA=C_GB$, the signal component as indicated by the following formula (19) is to be retained.

$$\text{VREF}+(1+2C_GA/C_FA)\times \Delta\text{Vsig1} \ldots \quad (19)$$

Finally, the column select transistor $M_{1\_3}A$ is turned ON by driving the horizontal select pulse φ H1 outputted from the horizontal scanning section 20 to H level. The signal component retained at the hold capacitor $C_{1\_2}A$ of the noise suppressing section 10A is read out respectively to the horizontal signal lines 15-1 and 15-2 and goes through the output amplifiers 16-1 and 16-2 so that the pixel signals of the unit pixels of the first row are read out respectively from the output channels OUT1 and OUT2. Similar operation is performed for a number of times equal to the total number of pixel rows so as to read the signals of all pixels respectively from the output channels OUT1 and OUT2. In 2-channel mode, therefore, a gain for the signals at the noise suppressing section is greater than that of 4-channel mode.

In this manner, with 2-channel mode according to the fourth embodiment where the signals of all pixels are read out only from the output channels OUT1 and OUT2 as compared to 4-channel mode where the signals of all pixels are read out from the output channels OUT1, OUT2, OUT3, and OUT4, the amplifying capacitor $C_GB$ of the noise suppressing section 10B corresponding to the output channels OUT3 and OUT4 is connected in parallel with the amplifying capacitor $C_GA$ of the noise suppressing section 10A corresponding to the output channels OUT1 and OUT2 to make it possible to provide function for increasing the gain at the noise suppressing section. Since effect of noise mixed after the noise suppressing section can thus be made smaller, it is possible to improve S/N ratio in 2-channel mode as compared to the prior-art example.

Figure 11:
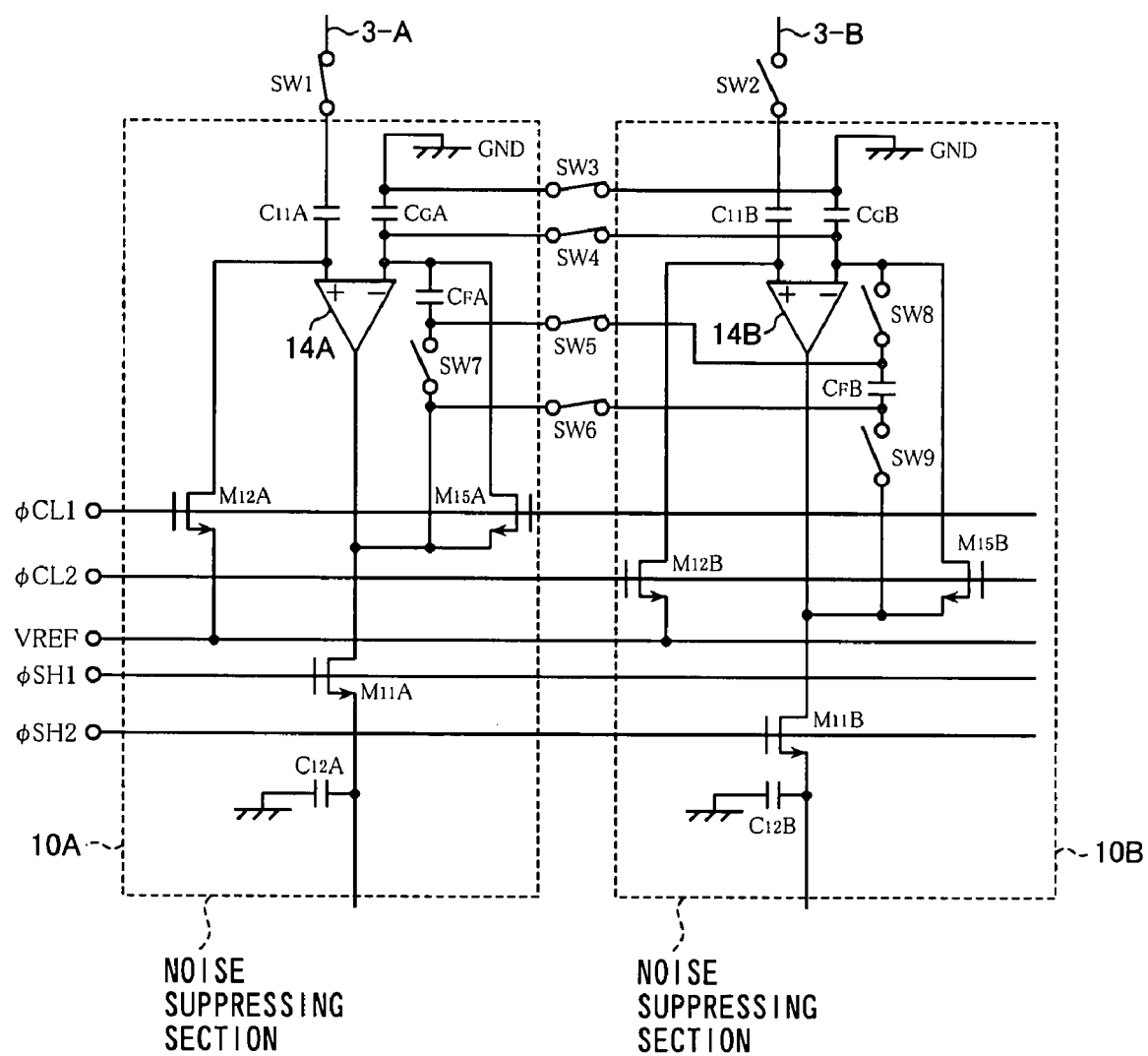
FIG. 11 is a circuit diagram showing a modification of the fourth embodiment shown in FIG. 9.

Further, as a modification of the fourth embodiment shown in FIG. 9, it is also possible to add switch devices SW5 to SW9 as shown in FIG. 11. Specifically, in this modification, a switch device SW7 is connected between one end of the feedback capacitor $C_FA$ and the output terminal of differential input amplifier 14A of the noise suppressing section 10A, and a switch device SW8 is connected between the inverting input terminal of differential input amplifier 14B and one end of feed back capacitor $C_FB$ of the noise suppressing section 10B. Further, a switch device SW9 is connected between the other end of the feedback capacitor $C_FB$ and the output terminal of the differential input amplifier 14B, and switch devices SW5 and SW6 are connected respectively between two ends of the switch device SW7 provided at the noise suppressing section 10A and two ends of the feedback capacitor $C_FB$ of the noise suppressing section 10B. Meantime, switch devices SW5~SW9 are controlled by the control signal generating section 21b.

In 2-channel mode of thus constructed modification, the feedback capacitor $C_FA$ of the noise suppressing section 10A and the feedback capacitor $C_FB$ of the noise suppressing section 10B can be connected in series. It is thereby possible to make even more greater the gain on the signals at the noise suppressing section as compared to 4-channel mode. It should be noted that, in the modification shown in FIG. 11, the gain on the signals at the noise suppressing section in 2-channel mode can be made greater than 4-channel mode even in the case where the reading is performed with connecting in series the feedback capacitors $C_FA$ and $C_FB$ in the noise suppressing section 10A and noise suppressing section 10B without using the switch devices SW3 and SW4. Since effect of noise mixed after the noise suppressing-section can thus be made smaller, it is possible to improve S/N ratio in 2-channel mode as compared to the prior-art example.

Embodiment 5

Figure 12:
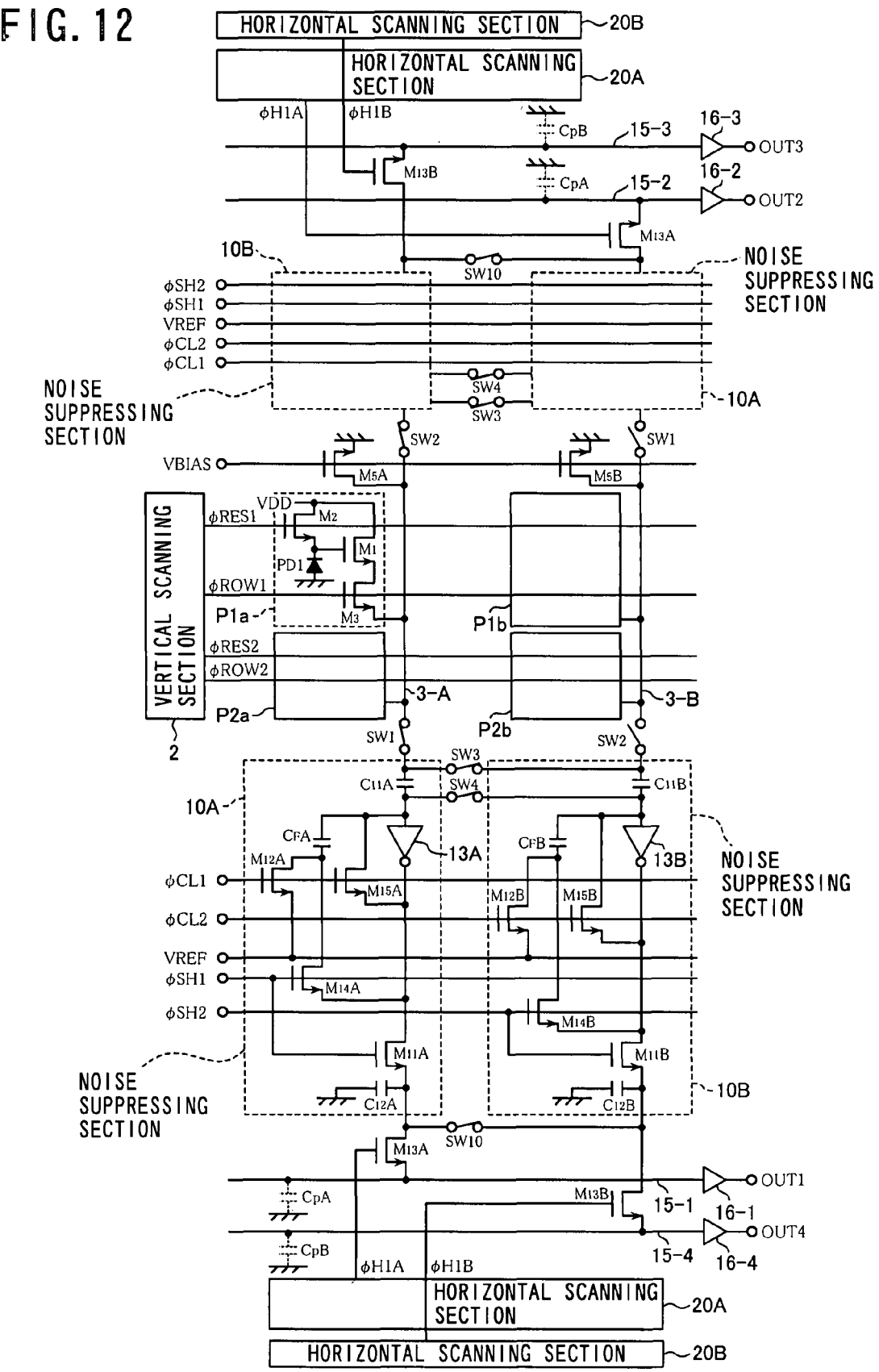
FIG. 12 is a circuit diagram showing in partially omitted manner construction of the solid-state imaging apparatus according to a fifth embodiment of the invention.

A fifth embodiment of the solid-state imaging apparatus according to the invention will now be described. FIG. 12 is a circuit diagram showing a portion of construction of the solid-state imaging apparatus according to the fifth embodiment. In this embodiment, a switch device SW10 is added to the construction of the second embodiment shown in FIG. 5, and separate horizontal scanning sections 20A, 20B are provided as horizontal scanning section in a manner respectively corresponding to the noise suppressing sections 10A, 10B. The construction other than that is similar to the second embodiment shown in FIG. 5, and like components are denoted by like reference numerals. Meantime, the horizontal scanning sections 20A, 20B and switch device SW10 are controlled by the control signal generating section 21b.

Figure 13A:
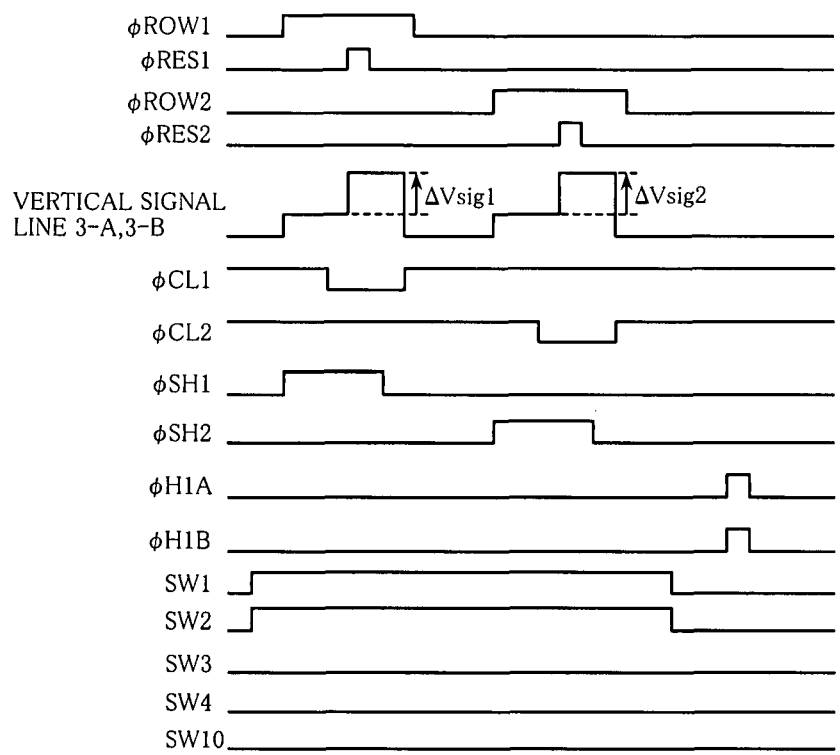
FIGS. 13A and 13B each are a timing chart for explaining operation of the fifth embodiment shown in FIG. 12.

An operation of thus constructed fifth embodiment will now be described. FIG. 13A is a timing chart for explaining operation of 4-channel mode in the fifth embodiment. At first in this mode, the switch device SW1 is ON, switch device SW2 ON, switch device SW3 OFF, switch device SW4 OFF, and switch device SW10 OFF. The timing of the other components is the same as the second embodiment. First, the signal component indicated by the following formula (20) is retained as signal component of photodiode PD1 of the unit pixel of the first row at the hold capacitor $C_{1\_2}A$ of the noise suppressing section 10A.

$$\text{VREF}-(C_{1\_1}A/C_FA)\times \Delta\text{Vsig1} \ldots \quad (20)$$

The signal component indicated by the following formula (21) is retained as signal component of photodiode PD1 of the unit pixel of the second row at the hold capacitor $C_{1\_2}B$ of the noise suppressing section 10B.

$$VREF-(C_{1\_1}B/C_FB) \times \Delta Vsig2 \ldots \quad (21)$$

The column select transistor $M_{1\_3}A$ is turned ON by driving to H level a horizontal select pulse $\phi$ H1A outputted from the horizontal scanning section 20A so that the signal components retained at the hold capacitor $C_{1\_2}A$ of the noise suppressing section 10A are read out respectively to the horizontal signal lines 15-1 and 15-2. At the same time, the column select transistor $M_{1\_3}B$ is turned ON by driving to H level a horizontal select pulse $\phi$H1B outputted from the horizontal scanning section 20B so that the signal components retained at the hold capacitor $C_{1\_2}B$ of the noise suppressing section 10B are read out respectively to the horizontal signal lines 15-3 and 15-4.

At this time, though not considered in the first to fourth embodiments, because of the effect of parasitic capacitance CpA, CpB associated with the horizontal signal lines 15-1 to 15-4, there is $C_{1\_2}A/(C_{1\_2}A+CpA)$ or $C_{1\_2}B/(C_{1\_2}B+CpB)$ acting as read gain onto the horizontal signal lines 15-1 to 15-4 so that the signal components are attenuated. The signals read out to the horizontal signal lines 15-1 to 15-4 then go through the output amplifiers 16-1 to 16-4 and are fetched from the output channels OUT1 to OUT4. Similar operation is performed for a number of times equal to one half of the total number of the pixel rows so as to read the signals of all pixels from the output channels OUT1, OUT2, OUT3, and OUT4.

Figure 13B:
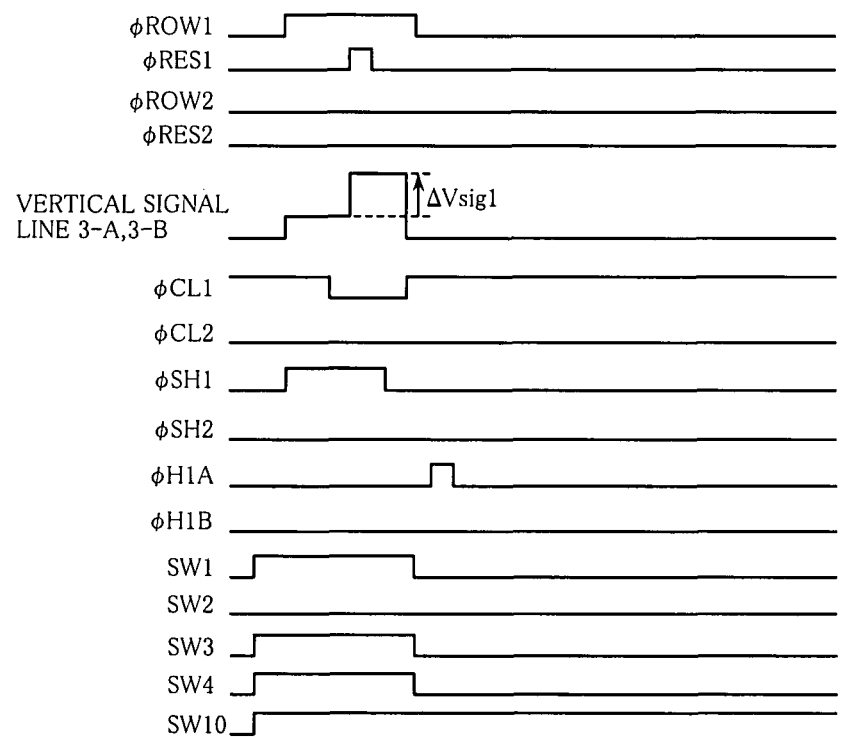

FIG. 13B is a timing chart for explaining operation of 2-channel mode in the fifth embodiment. At first in this mode, the switch device SW1 is ON, switch device SW2 OFF, switch device SW3 ON, and switch device SW4 ON, and SW10 ON. The clamping capacitors $C_{1\_1}A$ and $C_{1\_1}B$ of the noise suppressing section 10A and noise suppressing section 10B are thereby connected in parallel with each other. Further, the hold capacitors $C_{1\_2}A$ and $C_{1\_2}B$ of the noise suppressing section 10A and noise suppressing section 10B are connected in parallel with each other. The timing of the other components is the same as the second embodiment. The signal component indicated by the following formula (22) is thereby retained as signal component of photodiode PD1 of the unit pixel of the first row at the hold capacitors $C_{1\_2}A$ and $C_{1\_2}B$.

$$VREF-\{(C_{1\_1}A+C_{1\_1}B)/C_FA\} \times \Delta Vsig1 \ldots \quad (22)$$

Here, putting $C_{1\_1}A=C_{1\_1}B$, the signal component as indicated by the following formula (23) is to be retained.

$$VREF-(2C_{1\_1}A/C_FA) \times \Delta Vsig1 \ldots \quad (23)$$

Next, the column select transistor $M_{1\_3}A$ is turned ON by driving to H level the horizontal select pulse $\phi$ H1A outputted from the horizontal scanning section 20A so that the signal components retained at the hold capacitors $C_{1\_2}A$ and $C_{1\_2}B$ are read out respectively to the horizontal signal lines 15-1 and 15-2. At this time, because of the effect of parasitic capacitance CpA associated with the horizontal signal lines 15-1 and 15-2, the gain indicated by the following formula (24) is obtained on the signal component as read gain onto the horizontal signal lines 15-1 and 15-2.

$$(C_{1\_2}A+C_{1\_2}B)/(C_{1\_2}A+C_{1\_2}B+CpA) \quad (24)$$

Here, putting $C_{1\_2}A=C_{1\_2}B$, the gain indicated by the following formula (25) is to be obtained on the signal component.

$$(2C_{1\_2}A)/(2C_{1\_2}A+CpA) \ldots \quad (25)$$

The signals read out to the horizontal signal lines 15-1 and 15-2 then go through the output amplifiers 16-1 and 16-2 and are fetched respectively from the output channels OUT1 and OUT2. In this manner, the pixel signals of the first row are read out from the output channels OUT1 and OUT2. Similar operation is performed for a number of times equal to the total number of the pixel rows so as to read the signals of all pixels from the output channels OUT1 and OUT2. In 2-channel mode, therefore, a read gain onto the horizontal signal line can be made greater as compared to 4-channel mode.

In this manner, with 2-channel mode according-to the fifth embodiment where the signals of all pixels are read out only from the output channels OUT1 and OUT2 as compared to 4-channel mode where the signals of all pixels are read out from the output channels OUT1, OUT2, OUT3, and OUT4, the hold capacitor $C_{1\_2}B$ of the noise suppressing section 10B connected to the output channels OUT3 and OUT4 is connected in parallel with the hold capacitor $C_{1\_2}A$ of the noise suppressing section 10A connected to the output channels OUT1 and OUT2, and the reading onto the horizontal signal lines 15-1 and 15-2 is effected to make it possible to provide function for increasing the read gain onto the horizontal signal line. It is thereby possible to improve S/N in 2-channel mode as compared to the prior-art example.

The construction of the noise suppressing section of the present embodiment may be modified from the construction shown in FIG. 12, and its combination with the noise suppressing section illustrated in the first to fourth embodiments makes it possible to improve the gain at the noise suppressing section and the read gain onto the horizontal signal line. Since effect of noise mixed after the noise suppressing section can thus be made smaller, it is possible to improve S/N ratio in 2-channel mode as compared to the prior-art example.

Figure 14:
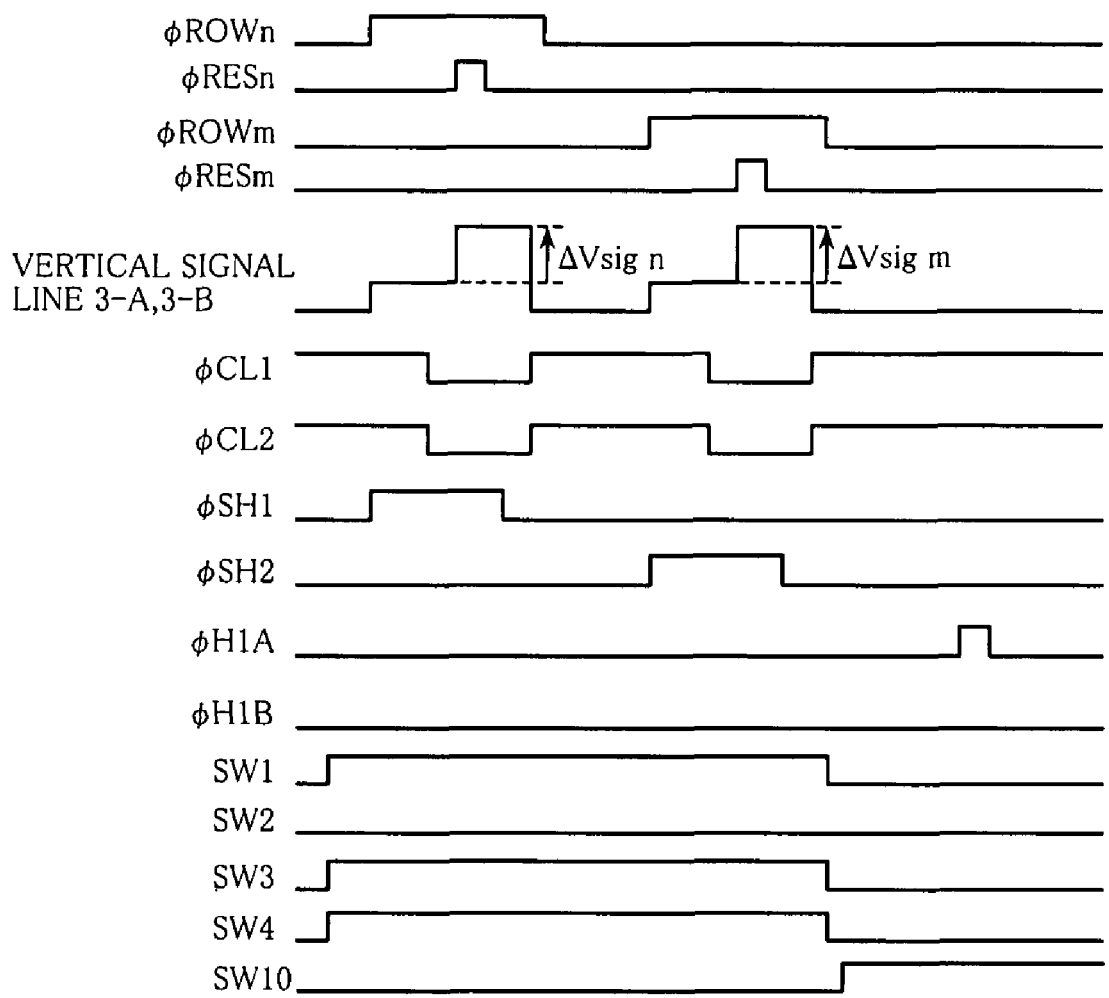
FIG. 14 is a timing chart for explaining another operation of the fifth embodiment shown in FIG. 12.

Further, by changing the operation timing of 2-channel mode to that shown in FIG. 14, the signals of different rows can be retained at the hold capacitors $C_{1\_2}A$ and $C_{1\_2}B$ of each of the noise suppressing sections 10A and 10B. Subsequently, the hold capacitors $C_{1\_2}A$ and $C_{1\_2}B$ are connected in parallel by turning ON the switch device SW10, and the horizontal select pulse $\phi$ H1A outputted from the horizontal scanning section 20A is then driven to H level to turn ON the column select transistor $M_{1\_3}A$, whereby the signal components retained at the hold capacitors $C_{1\_2}A$ and $C_{1\_2}B$ of each noise suppressing section 10A and 10B are read out respectively to the horizontal signal lines 15-1 and 15-2. It is thereby possible to obtain an added average of the pixel signals of the pixels in the vertical direction.

In this manner, with 2-channel mode according to the another operation timing shown in FIG. 14 of the fifth embodiment where the signals of all pixels are read out only from the output channels OUT1 and OUT2 as compared to 4-channel mode where the signals of all pixels are read out from the output channels OUT1, OUT2, OUT3, and OUT4, the signals of different rows are respectively retained at the hold capacitor $C_{1\_2}B$ of the noise suppressing section 10B connected to the output channels OUT3 and OUT4, and at the hold capacitor $C_{1\_2}A$ of the noise suppressing section 10A connected to the output channels OUT1 and OUT2. Subsequently, by connecting the hold capacitors $C_{1\_2}A$ and $C_{1\_2}B$ in parallel to effect the reading respectively to the horizontal signal lines 15-1 and 15-2, an added averaging of pixel signals of the pixels in vertical direction becomes possible. It is thereby possible to further provide a function which is not provided in 4-channel mode. In particular, when frame rate is to be improved by reducing the number of signals in a row direction, an output with suppressing occurrence of moire can be obtained by effecting an added averaging of pixel signals in the vertical direction.

It has been shown according to the above first to fifth embodiment that functions, which are not provided in 4-channel mode, can be achieved with 2-channel mode to improve image quality. These functions are preferably switchable according to such image taking conditions as ISO sensitivity.

In accordance with the present invention as has been described by way of the above embodiments, of a solid-state imaging apparatus where the number of output channels to be used is switched, capacitors of the noise suppressing section corresponding to those output channels that are not used can be effectively used in a read mode where fewer output channels are used, to obtain an increased gain at the noise suppressing section and to achieve function for adding pixels in the vertical direction which are not provided when many output channels are used. It is thereby possible to improve image quality in the read mode where fewer output channels are used.

What is claimed is:

1. A solid-state imaging apparatus comprising:
   a pixel section having pixels two-dimensionally disposed in a row and column directions each containing a photoelectric conversion section and an amplification section for amplifying and outputting pixel signals as output of said photoelectric conversion section;
   a first scanning section for selecting rows to be read from said pixel section;
   a noise suppressing section for effecting noise suppression of said pixel signals;
   a second scanning section for causing pixel signals, outputted to vertical signal lines, having gone through said noise suppressing section to be outputted from a plurality of horizontal signal lines, said plurality of horizontal signal lines are substantially orthogonal to said vertical lines; and
   a control section having a plurality of drive modes, each of said plurality of drive modes is adapted to set said horizontal signal lines from which said pixel signals are outputted such that the number of said horizontal lines set by said control section are different for each of said plurality of drive modes,
   wherein at least a drive mode of the plurality of drive modes changes the manner of connection of a function device within said noise suppressing section associated with said horizontal signal lines in accordance with said drive mode set by said control section so that a gain at the noise suppressing section is greater in said drive mode as compared to other of the plurality of drive modes,
   wherein said noise suppressing section comprises a plurality of noise suppressing subunits disposed at each of said horizontal signal lines, for effecting noise suppression of said pixel signals, each noise suppressing subunit comprising a capacitor,
   wherein said control section, when said drive mode is set, links said capacitor of a second noise suppressing subunit associated with a second horizontal signal line to said capacitor of a first noise suppressing subunit associated with a first horizontal signal line, wherein in said set drive mode the pixel signals are outputted only from said first horizontal line,
   wherein said noise suppressing subunit comprises a clamp type noise suppressing circuit having a clamping capacitor for generating output corresponding to a difference signal indicating difference from a second pixel signal level with using a first pixel signal level as reference, and
   wherein said control section, when said drive mode is set, connects the clamping capacitor of said second noise suppressing subunit in parallel with the clamping capacitor of said first noise suppressing subunit.

2. A solid-state imaging apparatus comprising:
   a pixel section having pixels two-dimensionally disposed in a row and column directions each containing a photoelectric conversion section and an amplification section for amplifying and outputting pixel signals as output of said photoelectric conversion section;
   a first scanning section for selecting rows to be read from said pixel section;
   a noise suppressing section for effecting noise suppression of said pixel signals;
   a second scanning section for causing pixel signals, outputted to vertical signal lines, having gone through said noise suppressing section to be outputted from a plurality of horizontal signal lines, said plurality of horizontal signal lines are substantially orthogonal to said vertical lines; and
   a control section having a plurality of drive modes, each of said plurality of drive modes is adapted to set said horizontal signal lines from which said pixel signals are outputted such that the number of said horizontal lines set by said control section are different for each of said plurality of drive modes,
   wherein at least a drive mode of the plurality of drive modes changes the manner of connection of a function device within said noise suppressing section associated with said horizontal signal lines in accordance with said drive mode set by said control section so that a gain at the noise suppressing section is greater in said drive mode as compared to other of the plurality of drive modes,
   wherein said noise suppressing section comprises a plurality of noise suppressing subunits disposed at each of said horizontal signal lines, for effecting noise suppression of said pixel signals, each noise suppressing subunit comprising a capacitor,
   wherein said control section, when said drive mode is set, links said capacitor of a second noise suppressing subunit associated with a second horizontal signal line to said capacitor of a first noise suppressing subunit associated with a first horizontal signal line, wherein in said set drive mode the pixel signals are outputted only from said first horizontal line, and
   wherein said noise suppressing subunit comprises a hold capacitor for retaining said pixel signals after noise suppression, and wherein said control section, when said drive mode is set, connects the hold capacitor of said second noise suppressing subunit in parallel with the hold capacitor of said first noise suppressing subunit.

3. The solid-state imaging apparatus according to claim 2, wherein, when said drive mode is set, pixels signals retained at the hold capacitor of said first noise suppressing subunit and at the hold capacitor of said second noise suppressing subunit are of different rows.

* * * * *